(12) United States Patent
Lewis Meza et al.

(10) Patent No.: US 10,755,046 B1
(45) Date of Patent: *Aug. 25, 2020

(54) APPLIED ARTIFICIAL INTELLIGENCE TECHNOLOGY FOR CONVERSATIONAL INFERENCING

(71) Applicant: Narrative Science Inc., Chicago, IL (US)

(72) Inventors: Maia Lewis Meza, Chicago, IL (US); Clayton Nicholas Norris, Chicago, IL (US); Michael Justin Smathers, Chicago, IL (US); Daniel Joseph Platt, Chicago, IL (US); Nathan D. Nichols, Chicago, IL (US)

(73) Assignee: NARRATIVE SCIENCE INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,000

(22) Filed: Feb. 15, 2019

Related U.S. Application Data

(60) Provisional application No. 62/632,017, filed on Feb. 19, 2018.

(51) Int. Cl.
*G06F 17/27* (2006.01)
*G06F 17/21* (2006.01)
(Continued)

(52) U.S. Cl.
CPC .......... *G06F 40/279* (2020.01); *G06F 40/211* (2020.01); *G06F 40/253* (2020.01); *G06F 40/30* (2020.01)

(58) Field of Classification Search
CPC .. G06F 17/278; G06F 16/288; G06F 17/2785; G06F 16/367
See application file for complete search history.

(56) References Cited

U.S. PATENT DOCUMENTS

| 4,992,939 A | 2/1991 | Tyler |
|---|---|---|
| 5,734,916 A | 3/1998 | Greenfield et al. |

(Continued)

FOREIGN PATENT DOCUMENTS

| WO | 2006122329 A2 | 11/2006 |
|---|---|---|
| WO | 2014035400 A1 | 3/2014 |

(Continued)

OTHER PUBLICATIONS

Allen et al., "StatsMonkey: A Data-Driven Sports Narrative Writer", Computational Models of Narrative: Papers from the AAAI Fall Symposium, Nov. 2010, 2 pages.

(Continued)

*Primary Examiner* — Olujimi A Adesanya
(74) *Attorney, Agent, or Firm* — Thompson Coburn LLP

(57) ABSTRACT

Disclosed herein is an NLP system that is able to extract meaning from a natural language message using improved parsing techniques. Such an NLP system can be used in concert with an NLG system to interactively interpret messages and generate response messages in an interactive conversational stream. The parsing can include (1) named entity recognition that contextualizes the meanings of words in a message with reference to a knowledge base of named entities understood by the NLP and NLG systems, (2) syntactically parsing the message to determine a grammatical hierarchy for the named entities within the message, (3) reduction of recognized named entities into aggregations of named entities using the determined grammatical hierarchy and reduction rules to further clarify the message's meaning, and (4) mapping the reduced aggregation of named entities to an intent or meaning, wherein this intent/meaning can be used as control instructions for an NLG process.

63 Claims, 13 Drawing Sheets

(51) Int. Cl.
  *G06F 40/279* (2020.01)
  *G06F 40/30* (2020.01)
  *G06F 40/211* (2020.01)
  *G06F 40/253* (2020.01)

(56) References Cited

U.S. PATENT DOCUMENTS

| | | |
|---|---|---|
| 5,802,495 A | 9/1998 | Goltra |
| 6,289,363 B1 | 9/2001 | Consolatti et al. |
| 6,917,936 B2 | 7/2005 | Cancedda |
| 6,968,316 B1 | 11/2005 | Hamilton |
| 6,976,031 B1 | 12/2005 | Toupal et al. |
| 7,246,315 B1 | 7/2007 | Andrieu et al. |
| 7,333,967 B1 | 2/2008 | Bringsjord et al. |
| 7,577,634 B2 | 8/2009 | Ryan et al. |
| 7,610,279 B2 | 10/2009 | Budzik et al. |
| 7,617,199 B2 | 11/2009 | Budzik et al. |
| 7,617,200 B2 | 11/2009 | Budzik et al. |
| 7,627,565 B2 | 12/2009 | Budzik et al. |
| 7,644,072 B2 | 1/2010 | Budzik et al. |
| 7,657,518 B2 | 2/2010 | Budzik et al. |
| 7,716,116 B2 | 5/2010 | Schiller |
| 7,778,895 B1 | 8/2010 | Baxter et al. |
| 7,836,010 B2 | 11/2010 | Hammond et al. |
| 7,840,448 B2 | 11/2010 | Musgrove et al. |
| 7,856,390 B2 | 12/2010 | Schiller |
| 7,865,496 B1 | 1/2011 | Schiller |
| 8,046,226 B2 | 10/2011 | Soble et al. |
| 8,355,903 B1 | 1/2013 | Birnbaum et al. |
| 8,374,848 B1 | 2/2013 | Birnbaum et al. |
| 8,447,604 B1 | 5/2013 | Chang |
| 8,463,695 B2 | 6/2013 | Schiller |
| 8,494,944 B2 | 7/2013 | Schiller |
| 8,515,737 B2 | 8/2013 | Allen |
| 8,612,208 B2 * | 12/2013 | Cooper .................. G06F 40/30 704/9 |
| 8,630,844 B1 | 1/2014 | Nichols et al. |
| 8,630,912 B2 | 1/2014 | Seki et al. |
| 8,630,919 B2 | 1/2014 | Baran et al. |
| 8,645,825 B1 | 2/2014 | Cornea et al. |
| 8,676,691 B2 | 3/2014 | Schiller |
| 8,688,434 B1 | 4/2014 | Birnbaum et al. |
| 8,762,133 B2 | 6/2014 | Reiter |
| 8,762,134 B2 | 6/2014 | Reiter |
| 8,775,161 B1 | 7/2014 | Nichols et al. |
| 8,812,311 B2 | 8/2014 | Weber |
| 8,843,363 B2 | 9/2014 | Birnbaum et al. |
| 8,886,520 B1 | 11/2014 | Nichols et al. |
| 8,892,417 B1 | 11/2014 | Nichols et al. |
| 9,135,244 B2 | 9/2015 | Reiter |
| 9,208,147 B1 | 12/2015 | Nichols et al. |
| 9,244,894 B1 | 1/2016 | Dale et al. |
| 9,251,134 B2 | 2/2016 | Birnbaum et al. |
| 9,323,743 B2 | 4/2016 | Reiter |
| 9,336,193 B2 | 5/2016 | Logan et al. |
| 9,355,093 B2 | 5/2016 | Reiter |
| 9,396,168 B2 | 7/2016 | Birnbaum et al. |
| 9,396,181 B1 | 7/2016 | Sripada et al. |
| 9,396,758 B2 | 7/2016 | Oz et al. |
| 9,405,448 B2 | 8/2016 | Reiter |
| 9,576,009 B1 | 2/2017 | Hammond et al. |
| 9,697,178 B1 | 7/2017 | Nichols et al. |
| 9,697,197 B1 | 7/2017 | Birnbaum et al. |
| 9,697,492 B1 | 7/2017 | Birnbaum et al. |
| 9,720,884 B2 | 8/2017 | Birnbaum et al. |
| 9,720,899 B1 | 8/2017 | Birnbaum et al. |
| 9,977,773 B1 | 5/2018 | Birnbaum et al. |
| 9,990,337 B2 | 6/2018 | Birnbaum et al. |
| 10,115,108 B1 | 10/2018 | Gendelev et al. |
| 10,185,477 B1 | 1/2019 | Paley et al. |
| 10,572,606 B1 * | 2/2020 | Paley .................. G06N 5/025 |
| 10,585,983 B1 * | 3/2020 | Paley .................. G06F 40/30 |
| 2002/0083025 A1 | 6/2002 | Robarts et al. |
| 2002/0107721 A1 | 8/2002 | Darwent et al. |
| 2003/0061029 A1 | 3/2003 | Shaket |
| 2004/0138899 A1 | 7/2004 | Birnbaum et al. |
| 2004/0225651 A1 | 11/2004 | Musgrove et al. |
| 2004/0255232 A1 | 12/2004 | Hammond et al. |
| 2005/0027704 A1 | 2/2005 | Hammond et al. |
| 2005/0028156 A1 | 2/2005 | Hammond et al. |
| 2005/0125213 A1 | 6/2005 | Chen et al. |
| 2005/0137854 A1 | 6/2005 | Cancedda et al. |
| 2005/0273362 A1 | 12/2005 | Harris et al. |
| 2006/0031182 A1 | 2/2006 | Ryan et al. |
| 2006/0101335 A1 | 5/2006 | Pisciottano |
| 2006/0181531 A1 | 8/2006 | Goldschmidt |
| 2006/0212446 A1 | 9/2006 | Hammond et al. |
| 2006/0253783 A1 | 11/2006 | Vronay et al. |
| 2006/0271535 A1 | 11/2006 | Hammond et al. |
| 2006/0277168 A1 | 12/2006 | Hammond et al. |
| 2007/0132767 A1 | 6/2007 | Wright et al. |
| 2007/0185846 A1 | 8/2007 | Budzik et al. |
| 2007/0185847 A1 | 8/2007 | Budzik et al. |
| 2007/0185861 A1 | 8/2007 | Budzik et al. |
| 2007/0185862 A1 | 8/2007 | Budzik et al. |
| 2007/0185863 A1 | 8/2007 | Budzik et al. |
| 2007/0185864 A1 | 8/2007 | Budzik et al. |
| 2007/0185865 A1 | 8/2007 | Budzik et al. |
| 2007/0250479 A1 | 10/2007 | Lunt et al. |
| 2007/0250826 A1 | 10/2007 | O'Brien |
| 2008/0250070 A1 | 10/2008 | Abdulla et al. |
| 2008/0256066 A1 | 10/2008 | Zuckerman et al. |
| 2008/0304808 A1 | 12/2008 | Newell et al. |
| 2008/0306882 A1 | 12/2008 | Schiller |
| 2008/0313130 A1 | 12/2008 | Hammond et al. |
| 2009/0019013 A1 | 1/2009 | Tareen et al. |
| 2009/0030899 A1 | 1/2009 | Tareen et al. |
| 2009/0049041 A1 | 2/2009 | Tareen et al. |
| 2009/0083288 A1 | 3/2009 | LeDain et al. |
| 2009/0144608 A1 | 6/2009 | Oisel et al. |
| 2009/0175545 A1 | 7/2009 | Cancedda et al. |
| 2010/0146393 A1 | 6/2010 | Land et al. |
| 2010/0161541 A1 | 6/2010 | Covannon et al. |
| 2011/0022941 A1 | 1/2011 | Osborne et al. |
| 2011/0044447 A1 | 2/2011 | Morris et al. |
| 2011/0077958 A1 | 3/2011 | Breitenstein et al. |
| 2011/0078105 A1 * | 3/2011 | Wallace .................. G06N 5/047 706/47 |
| 2011/0087486 A1 | 4/2011 | Schiller |
| 2011/0099184 A1 | 4/2011 | Symington |
| 2011/0113315 A1 | 5/2011 | Datha et al. |
| 2011/0246182 A1 | 10/2011 | Allen |
| 2011/0249953 A1 | 10/2011 | Suri et al. |
| 2011/0288852 A1 | 11/2011 | Dymetman et al. |
| 2011/0295903 A1 | 12/2011 | Chen |
| 2011/0314381 A1 | 12/2011 | Fuller et al. |
| 2012/0011428 A1 | 1/2012 | Chisholm |
| 2012/0069131 A1 | 3/2012 | Abelow |
| 2012/0109637 A1 * | 5/2012 | Merugu .................. G06F 17/271 704/9 |
| 2012/0158850 A1 | 6/2012 | Harrison et al. |
| 2013/0041677 A1 | 2/2013 | Nusimow et al. |
| 2013/0091031 A1 | 4/2013 | Baran et al. |
| 2013/0144605 A1 | 6/2013 | Brager et al. |
| 2013/0145242 A1 | 6/2013 | Birnbaum et al. |
| 2013/0174026 A1 | 7/2013 | Locke |
| 2013/0211855 A1 | 8/2013 | Eberle et al. |
| 2013/0246934 A1 | 9/2013 | Wade et al. |
| 2013/0262092 A1 | 10/2013 | Wasick |
| 2013/0304507 A1 | 11/2013 | Dail et al. |
| 2014/0006012 A1 * | 1/2014 | Zhou .................. G06F 16/3344 704/9 |
| 2014/0163962 A1 * | 6/2014 | Castelli .................. G06F 17/2715 704/9 |
| 2014/0200878 A1 | 7/2014 | Mylonakis et al. |
| 2014/0356833 A1 | 12/2014 | Sabczynski et al. |
| 2014/0375466 A1 | 12/2014 | Reiter |
| 2015/0049951 A1 | 2/2015 | Chaturvedi et al. |
| 2015/0078232 A1 | 3/2015 | Djinki et al. |
| 2015/0142704 A1 * | 5/2015 | London .................. G06F 16/90332 706/11 |
| 2015/0169548 A1 * | 6/2015 | Reiter .................. G06F 17/2881 704/9 |
| 2015/0186504 A1 | 7/2015 | Gorman et al. |

(56) References Cited

U.S. PATENT DOCUMENTS

| | | | |
|---|---|---|---|
| 2015/0199339 | A1 | 7/2015 | Mirkin et al. |
| 2015/0227508 | A1 | 8/2015 | Howald et al. |
| 2015/0227588 | A1* | 8/2015 | Shapira .............. G06F 16/9535 |
| | | | 707/722 |
| 2015/0242384 | A1 | 8/2015 | Reiter |
| 2015/0324347 | A1 | 11/2015 | Bradshaw et al. |
| 2015/0324351 | A1 | 11/2015 | Sripada et al. |
| 2015/0324374 | A1 | 11/2015 | Sripada et al. |
| 2015/0325000 | A1 | 11/2015 | Sripada |
| 2015/0331850 | A1* | 11/2015 | Ramish .............. G06F 17/2785 |
| | | | 704/9 |
| 2015/0347400 | A1 | 12/2015 | Sripada |
| 2015/0347901 | A1 | 12/2015 | Cama et al. |
| 2015/0363364 | A1 | 12/2015 | Sripada |
| 2016/0019200 | A1 | 1/2016 | Allen |
| 2016/0026253 | A1 | 1/2016 | Bradski et al. |
| 2016/0132489 | A1 | 5/2016 | Reiter |
| 2016/0140090 | A1 | 5/2016 | Dale et al. |
| 2016/0217133 | A1 | 7/2016 | Reiter et al. |
| 2016/0232152 | A1 | 8/2016 | Mahamood |
| 2016/0232221 | A1* | 8/2016 | McCloskey .......... G06F 16/285 |
| 2017/0004415 | A1 | 1/2017 | Moretti et al. |
| 2017/0026705 | A1* | 1/2017 | Yeh ....................... G06F 17/278 |
| 2017/0060857 | A1 | 3/2017 | Imbruce et al. |
| 2017/0116327 | A1 | 4/2017 | Gorelick et al. |
| 2017/0199928 | A1* | 7/2017 | Zhao ................. G06F 16/24522 |
| 2017/0242886 | A1* | 8/2017 | Jolley ................. G06F 17/2705 |
| 2017/0270105 | A1 | 9/2017 | Ninan et al. |
| 2017/0371856 | A1 | 12/2017 | Can et al. |
| 2018/0025726 | A1* | 1/2018 | Gatti de Bayser ..... G10L 15/22 |
| | | | 704/257 |
| 2018/0260380 | A1 | 9/2018 | Birnbaum et al. |
| 2018/0285324 | A1 | 10/2018 | Birnbaum et al. |
| 2018/0293483 | A1* | 10/2018 | Abramson ............. G06N 3/006 |

FOREIGN PATENT DOCUMENTS

| | | | |
|---|---|---|---|
| WO | 2014035402 | A1 | 3/2014 |
| WO | 2014035403 | A1 | 3/2014 |
| WO | 2014035406 | A1 | 3/2014 |
| WO | 2014035407 | A1 | 3/2014 |
| WO | 2014035447 | A1 | 3/2014 |
| WO | 2014070197 | A1 | 5/2014 |
| WO | 2014076524 | A1 | 5/2014 |
| WO | 2014076525 | A1 | 5/2014 |
| WO | 2014102568 | A1 | 7/2014 |
| WO | 2014102569 | A1 | 7/2014 |
| WO | 2014111753 | A1 | 7/2014 |
| WO | 2015028844 | A1 | 3/2015 |
| WO | 2015159133 | A1 | 10/2015 |

OTHER PUBLICATIONS

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.

Asset Economics, Inc. (Feb. 11, 2011).

Bailey, P. (1999). Searching for Storiness: Story-Generation from a Reader's Perspective. AAAI Technical Report FS-99-01.

Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS—2005), San Diego, Califomia.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.

Boyd, S. (1998). TREND: a system for generating intelligent descriptions of time series data. Paper presented at Proceedings of the IEEE international conference on intelligent processing systems (ICIPS—1998).

Character Writer Version 3.1, Typing Chimp Software LLC, 2012, screenshots from working program, pp. 1-19.

Dehn, N. (1981). Story generation after TALE-SPIN. In Proceedings of the Seventh International Joint Conference on Artificial Intelligence. (Vancouver, Canada).

Dramatica Pro version 4, Write Brothers, 1993-2006, user manual.

Gatt, A., and Portet, F. (2009). Text content and task performance in the evaluation of a Natural Language Generation System. Proceedings of the Conference on Recent Advances in Natural Language Processing (RANLP-09).

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural-Language Processing to Produce Weather Forecasts. IEEE Expert, 9 (2), 45.

Hargood, C., Millard, D. and Weal, M. (2009) Exploring the Importance of Themes in Narrative Systems.

Hargood, C., Millard, D. and Weal, M. (2009). Investigating a Thematic Approach to Nan-ative Generation, 2009.

Hunter, J., Freer, Y., Gall, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.

Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.

Kittredge, R., and Lavoie, B. (1998). MeteoCogent: A Knowledge-Based Tool for Generating Weather Forecast Texts. In Proceedings of the American Meteorological Society AI Conference (AMS-98), Phoenix, Arizona.

Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.

Kukich, K. (1983). Design of a Knowledge-Based Report Generator. Proceedings of the 21st Conference of the Association for Computational Linguistics, Cambridge, MA, pp. 145-150.

Kukich, K. (1983). Knowledge-Based Report Generation: A Technique for Automatically Generating Natural Language Reports from Databases. Paper presented at Proceedings of the Sixth International ACM SIGIR Conference, Nashington, DC.

McKeown, K., Kukich, K., & Shaw, J. (1994). Practical issues in automatic documentation generation. 4th Conference on Applied Natural Language Processing, Stuttgart, Germany, pp. 7-14.

Meehan, James R., TALE-SPIN. (1977). An Interactive Program that Writes Stories. In Proceedings of the Fifth International Joint Conference on Artificial Intelligence.

Memorandum Opinion and Order for *O2 Media, LLC v. Narrative Science Inc.*, Case 1:15-cv-05129 (N.D. IL), Feb. 25, 2016, 25 pages (invalidating claims of U.S. Pat. Nos. 7,856,390, 8,494,944, and 8,676,691 owned by O2 Media, LLC.

Moncur, W., and Reiter, E. (2007). How Much to Tell? Disseminating Affective Information across a Social Network. Proceedings of Second International Workshop on Personalisation for e-Health.

Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.

Movie Magic Screenwriter, Write Brothers, 2009, user manual.

(56) References Cited

OTHER PUBLICATIONS

Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.
Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.
Reiter et al., "Building Applied Natural Generation Systems", Cambridge University Press, 1995, pp. 1-32.
Reiter, E., (2007). An architecture for Data-to-Text systems. In: Busemann, Stephan (Ed.), Proceedings of the 11th European Workshop on Natural Language Generation, pp. 97-104.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter, E., Sripada, S., Hunter, J., Yu, J., and Davy, I. (2005). Choosing words in computer-generated weather forecasts. Artificial Intelligence, 167:137-169.
Riedl et al., "Narrative Planning: Balancing Plot and Character", Journal of Artificial Intelligence Research, 2010, pp. 217-268, vol. 39.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acero, A. 2000. Automatically extracting highlights for TV Baseball programs. In Proceedings of the eighth ACM international conference on Multimedia. (Manna del Rey, California, United States). ACM Press, New York, NY 105-115.
Sripada, S., Reiter, E., and Davy, I. (2003). SumTime-Mousam: Configurable Marine Weather Forecast Generator. Expert Update 6(3):4-10.
Storyview, Screenplay Systems, 2000, user manual.
Theune, M., Klabbers, E., Odijk, J., dePijper, J., and Krahmer, E. (2001) "From Data to Speech: A General Approach", Natural Language Engineering 7(1): 47-86.
Thomas, K., and Sripada, S. (2007). Atlas.txt: Linking Geo-referenced Data to Text for NLG. Paper presented at Proceedings of the 2007 European Natural Language Generation Workshop (ENLGO7).
Thomas, K., and Sripada, S. (2008). What's in a message? Interpreting Geo-referenced Data for the Visually-impaired. Proceedings of the Int. conference on NLG.
Thomas, K., Sumegi, L., Ferres, L., and Sripada, S. (2008). Enabling Access to Geo-referenced Information: Atlas.txt. Proceedings of the Cross-disciplinary Conference on Web Accessibility.
Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.
Yu, J., Reiter, E., Hunter, J., and Mellish, C. (2007). Choosing the content of textual summaries of large time-series data sets. Natural Language Engineering, 13:25-49.
Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE—2003, pp. 379-384. Springer (LNAI 2718).

* cited by examiner

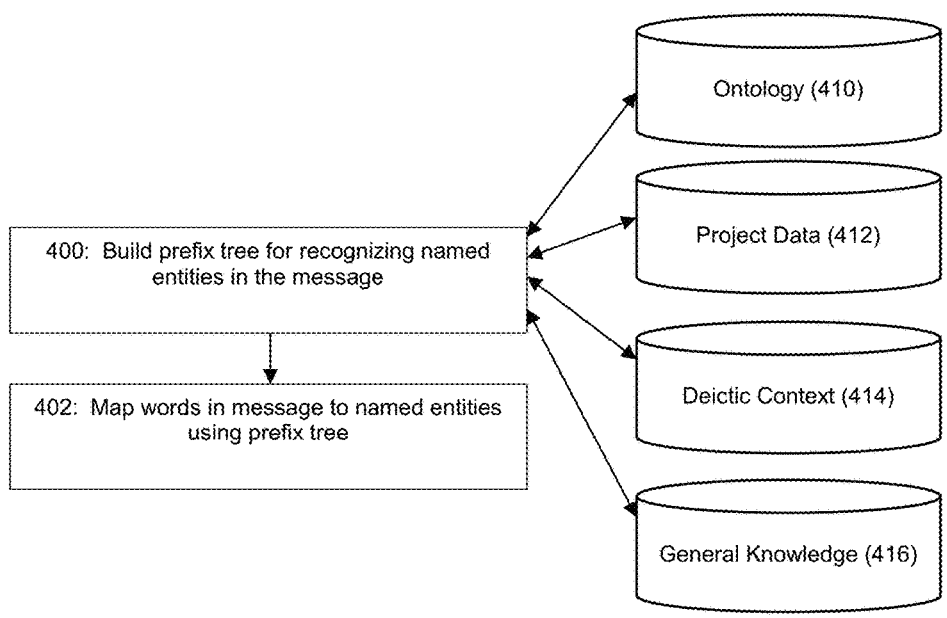

Figure 4A

```
{
    "aaron": { "young": {"_values_": EntityInstance(Aaron Young)}},
    "generate": {"_value_": Attribute(sales value)},
    "he": {"_value_": EntityInstance(Aaron Young)},
    "sales": {
        "goal": {"_values_": Attribute(sales goal)},
        "value": {"_values_": Attribute(sales value)},
    },
    "salesperson": {"_values_": EntityType(salesperson)},
    "salespeople": {"_values_": EntityType(salesperson)},
    "highest": {"_values_": Qualifier(Top Ranked)},
}
```

Figure 4B

602 Entity + Qualifier(Rank) + Attribute -> Entity
604 RelationshipType + Entity -> Relationship
606 Entity + Relationship -> Entity
608 EntityType -> Entity 702: Entity -> CalloutEntity(Entity)

704: Entity + Attribute -> PresentValue(Entity,Attribute)

706: Entity + Attribute + Qualifier(Driver) -> Explain(Entity,Attribute,Driver)

708: Entity + Attribute + Qualifier(Change) + Timeframe -> Present Change(Entity,Attribute,Change,Timeframes)

710: Entity + Attribute + Qualifier(Change) + Qualifier(Driver) + Timeframe + Timeframe -> Explain Change(Entity,Attribute,Change,Driver,Timeframes)

Figure 7A

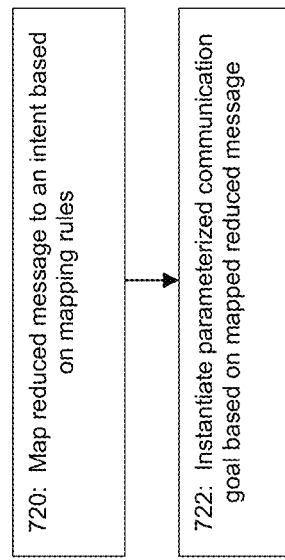

720: Map reduced message to an intent based on mapping rules

722: Instantiate parameterized communication goal based on mapped reduced message

Figure 7B

```python
class Drivers(ConversationalIntent):
    """Intent class for driver analysis For entity groups, this maps to a simplification of an "Analyze"
    communication goal For single entities, this maps to a simplification of the "Explain"
    communication goal
    """

def _analyze_group_attribute(self):
        """Driver analysis for groups"""
        timeframe = self.timeframes[0] if self.timeframes else None
        top_entity = RankGroup(
            self.entity, self.attribute.name, start=1, timeframe=timeframe)
        return [[
            Count(self.entity),
            Total(self.entity, self.attribute.name, *self.timeframes),
            top_entity,
            Value(top_entity, self.attribute.name, *self.timeframes)
        ]]

def _explain_smart_attribute(self):
        """Driver analysis for smart attribute of a single entity"""
        timeframe = self.timeframes[0] if self.timeframes else None
        return [[
            Explain(
                self.entity, self.attribute.name,
                timeframe=timeframe, count=True,
                callout_top=True, present_top=True)
        ]]

def _generate_outline(self):
        """Generate different outlines based on the size of the group"""
        if ~Count(self.entity) == 1:
            return self._explain_smart_attribute()
        return self._analyze_group_attribute()
```

What is Logitech's revenue this year?  902

In 2017, Logitech has generated $19.93M in revenue.

904 —

What is the best selling product this year?  906

In 2017, Reaver FY13 (29,661 units) has been the best selling product.

908 —

How much does it cost?  910

It costs $349.98.

912 —

How much revenue did it generate this year?  914

In 2017, it has generated $5.19M in revenue.

916 —

What category is it in?  918

It is in Gaming Headsets.

920 —

What is the worst selling product in Gaming Headsets this year?

In 2017, Holyfield (-325 units) has been the worst seller product in Gaming Headsets.

924 —  922

How much did the Gaming Headsets' revenue change from last year to this year?

Its revenue has increased by $3.35M (42.84%), from $7.83M in 2016 to $11.18M in 2017.

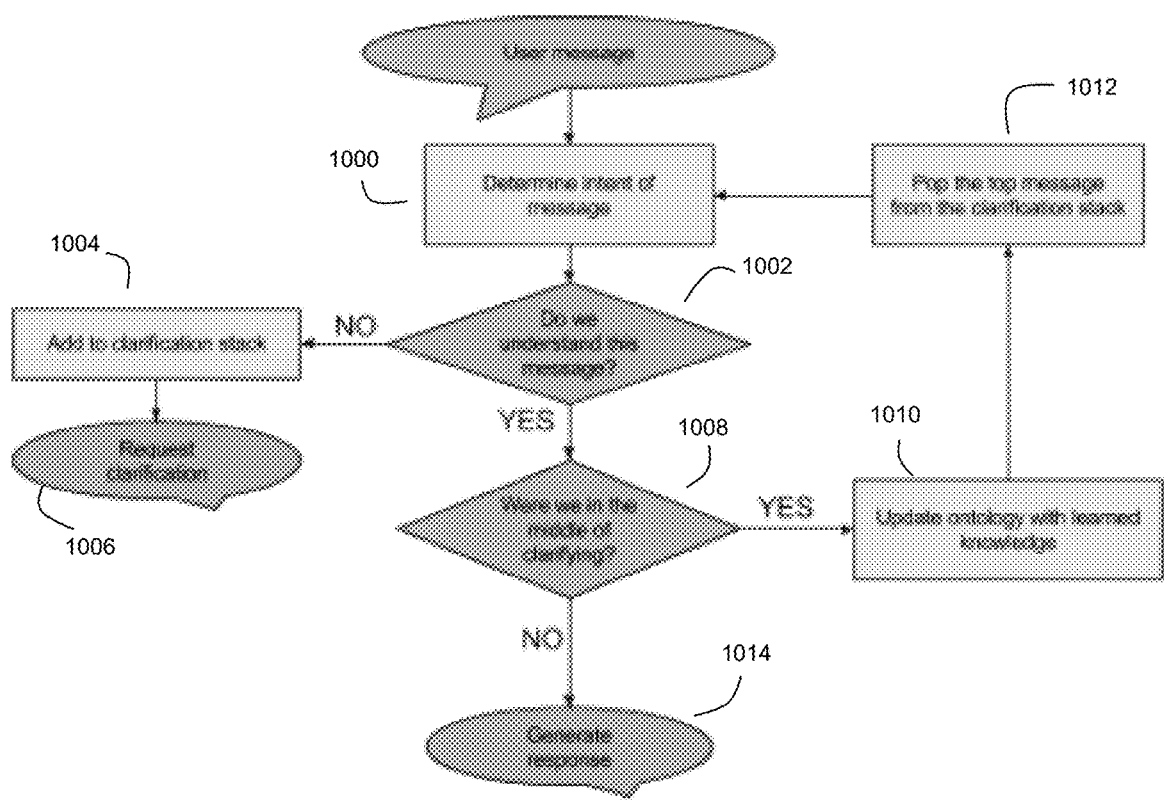

Figure 10A

User: "Which region generated the most last year?"
    *(CONVO detects the unknown verb, prompting clarification)*
Quill: "I don't know what it means to 'generate', which attribute does it apply to?"
User: "Revenue"
    *(CONVO recognizes this as an attribute, adds "generate" to that attribute's expressions, then re-parses and answers the original question)*
Quill: "The West region ($14M) generated the most in revenue in 2017"

Figure 10B

APPLIED ARTIFICIAL INTELLIGENCE TECHNOLOGY FOR CONVERSATIONAL INFERENCING

CROSS-REFERENCE AND PRIORITY CLAIM TO RELATED PATENT APPLICATIONS

This patent application claims priority to U.S. Provisional patent application Ser. No. 62/632,017, filed Feb. 19, 2018, and entitled "Applied Artificial Intelligence Technology for Conversational Inferencing and Interactive Natural Language Generation", the entire disclosure of which is incorporated herein by reference.

This patent application is also related to (1) U.S. patent application Ser. No. 16/277,003, filed this same day, and entitled "Applied Artificial Intelligence Technology for Conversational Inferencing and Interactive Natural Language Generation", (2) U.S. patent application Ser. No. 16/277,004, filed this same day, and entitled "Applied Artificial Intelligence Technology for Contextualizing Words to a Knowledge Base Using Natural Language Processing", (3) U.S. patent application Ser. No. 16/277,006, filed this same day, and entitled "Applied Artificial Intelligence Technology for Conversational Inferencing Using Named Entity Reduction", and (4) U.S. patent application Ser. No. 16/277,008, filed this same day, and entitled "Applied Artificial Intelligence Technology for Building a Knowledge Base Using Natural Language Processing", the entire disclosures of each of which are incorporated herein by reference.

INTRODUCTION

There is an ever-growing need in the art for improved interactive natural language generation (NLG) technology, particularly interactive NLG technology that generates natural language responses to conversational inputs. However, such systems present complexities not only in terms of NLG capabilities but also natural language processing (NLP) capabilities.

NLG is a subfield of artificial intelligence (AI) concerned with technology that produces language as output on the basis of some input information or structure (e.g., where the input constitutes data about a situation to be analyzed and expressed in natural language).

NLP is a subfield of AI concerned with technology that interprets natural language inputs, and natural language understanding (NLU) is a subfield of NLP concerned with technology that draws conclusions on the basis of some input information or structure.

A computer system that interactively produces natural language outputs in response to natural language inputs needs to combine these difficult areas of NLG and NLP/NLU so that the interactive system not only understands the meaning of an input natural language statement but also is able to determine an appropriate natural language response based on this understood meaning. The inventors disclose herein a number of technical advances with respect to interactive NLP/NLG systems.

For example, the inventors disclose an improved NLP system that is able to extract meaning from a natural language message using improved parsing techniques. Conventional NLP systems have relied on template approaches where system designers must (1) anticipate different manners by which a user might phrase an input question, (2) build templates that correspond to these alternate phrasings, and (3) devise pattern matching algorithms that are able to map input strings to these templates. These conventional flat intent parsers cannot handle the arbitrary recursive compositionality of language. In a departure from these templated approaches in the art, the inventors disclose a number of example embodiments that avoid template mapping through the use of parsing techniques that can extract meaning from the content of an input string in a manner that significantly less constrained by the particular order of words in the input string.

In an example embodiment, such parsing can include named entity recognition that contextualizes the meanings of words in a message with reference to a knowledge base of named entities understood by the NLP and NLG systems.

The parsing can also include syntactically parsing the message to determine a grammatical hierarchy for the named entities within the message.

Further still, such parsing can include a reduction of the recognized named entities into aggregations of named entities using the determined grammatical hierarchy and reduction rules that define how combinations of named entities can be reduced into the aggregations in order to further clarify the message's meaning.

Moreover, the parsing can include mapping the reduced aggregation of named entities to an intent or meaning, wherein this intent/meaning can be used as control instructions for an NLG process.

As another example, the NLP system can leverage the same knowledge base that supports the NLG system to gain understandings about an input message. For example, the ontology used to support NLG can also be used to recognize terms in an input message. By integrating the NLP system with the NLG system in terms of their underlying knowledge bases, the NLP and NLG systems stay calibrated with each other such that (1) the NLP system will not draw inferences that cannot be understood by the NLG system, and (2) the NLG system will not produce responses that are unrelated to the inferences drawn by the NLP system.

As yet another example, the inventors disclose techniques through which the NLP and NLG systems can learn and adapt their capabilities in response to conversational inputs. Thus, information learned through the NLP process can be used by the NLG system to produce better outputs.

Through these and other features, example embodiments of the invention provide significant technical advances in the NLG and NLP arts by harnessing computer technology to improve how natural language inputs are processed to produce natural language outputs in a manner that supports interactive conversations between humans and machines.

BRIEF DESCRIPTION OF THE DRAWINGS

FIG. 4A discloses an example process flow for named entity recognition in support of NLP in accordance with an example embodiment.

FIG. 4B discloses an example prefix tree that can be used for recognizing named entities in a conversational input string.

FIG. 7A discloses an example set of mapping rules for mapping reduced named entities to communication goal statements for an NLG system.

FIG. 7B discloses an example process flow for mapping reduced named entities to communication goal statements for an NLG system.

FIG. 8 discloses an example data structure that defines a conditional outcome framework for use with the NLG system to determine ideas for inclusion in a conversation string response as a function of a parameterization of the understood meaning of a conversation string input.

FIG. 9 disclose an example interactive conversation string that can be produced by an example embodiment.

FIG. 10A discloses an example process flow through which the system can learn meanings for words from users.

FIG. 10B shows an example interactive conversation string that can be used by the system to learn meanings for words.

DETAILED DESCRIPTION OF EXAMPLE EMBODIMENTS

Figure 1:
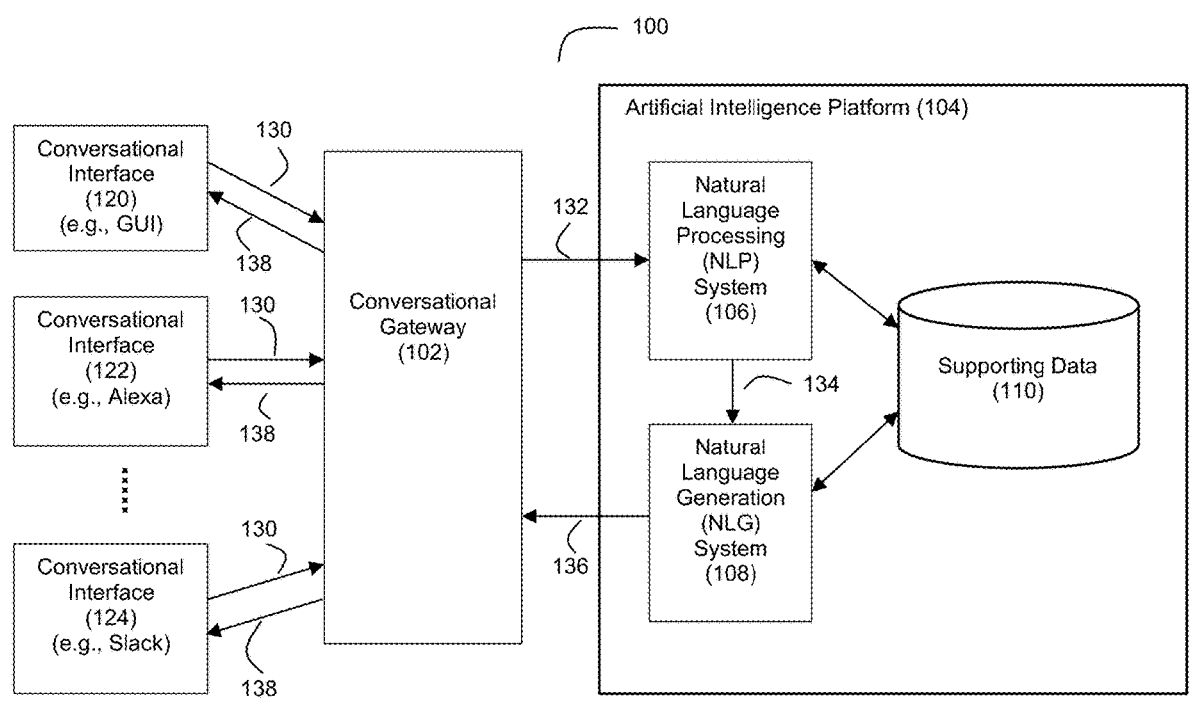
FIG. 1 discloses an example interactive AI computer system in accordance with an example embodiment.

FIG. 1 shows an example computer system 100 in accordance with an example embodiment. The computer system 100 may comprise a conversational gateway 102 that links an artificial intelligence (AI) platform 104 with a plurality of channels such as conversational interfaces 120, 122, and 124. The conversational interfaces can be one or more different types of natural language conversational interfaces. For example, conversational interface 120 can take the form of a graphical user interface (GUI) through which a user types a message in a natural language (e.g., a question in a natural language). As another example, conversational interface 122 can take the form of a natural language conversational interface that utilizes speech recognition to convert spoken utterances into messages. A number of third party interfaces for use in chatbots are available, an example of which includes the Alexa interface for chatbot services from Amazon. As yet another example, conversational interface 124 can take the form of the Slack interface from Slack Technologies, Inc. Thus, user inputs into the conversational interfaces 120, 122, and 124 result in natural language messages 130 being delivered to the conversational gateway 102. These natural language messages 130 can represent a plurality of words expressed in natural language, such as a question that is to be answered by the AI platform 104 or a statement in response to a question posed by the AI platform 104. These example channels may communicate with the conversational gateway 102 over a network such as the Internet.

The computer system 100 comprises one or more processors and associated memories that cooperate together to implement the operations discussed herein. The computer system 100 may also include a data source that serves as a repository of data for analysis by the AI platform 104 when processing inputs and generating outputs. These components can interconnect with each other in any of a variety of manners (e.g., via a bus, via a network, etc.). For example, the computer system 100 can take the form of a distributed computing architecture where one or more processors implement the NLP tasks described herein (see NLP system 106), one or more processors implement the NLG tasks described herein (see NLG system 108). Furthermore, different processors can be used for NLP and NLG tasks, or alternatively some or all of these processors may implement both NLP and NLG tasks. It should also be understood that the computer system 100 may include additional or different components if desired by a practitioner.

The one or more processors may comprise general-purpose processors (e.g., a single-core or multi-core microprocessor), special-purpose processors (e.g., an application-specific integrated circuit or digital-signal processor), programmable-logic devices (e.g., a field programmable gate array), etc. or any combination thereof that are suitable for carrying out the operations described herein. The associated memories may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory may also be integrated in whole or in part with other components of the system 100. Further, the memory may be local to the processor(s), although it should be understood that the memory (or portions of the memory) could be remote from the processor(s), in which case the processor(s) may access such remote memory through a network interface. The memory may store software programs or instructions that are executed by the processor(s) during operation of the system 100. Such software programs can take the form of a plurality of instructions configured for execution by processor(s). The memory may also store project or session data generated and used by the system 100. The data source can be any source of data, such as one or more databases, file systems, computer networks, etc. which may be part of the memory accessed by the processor(s).

Figure 2:
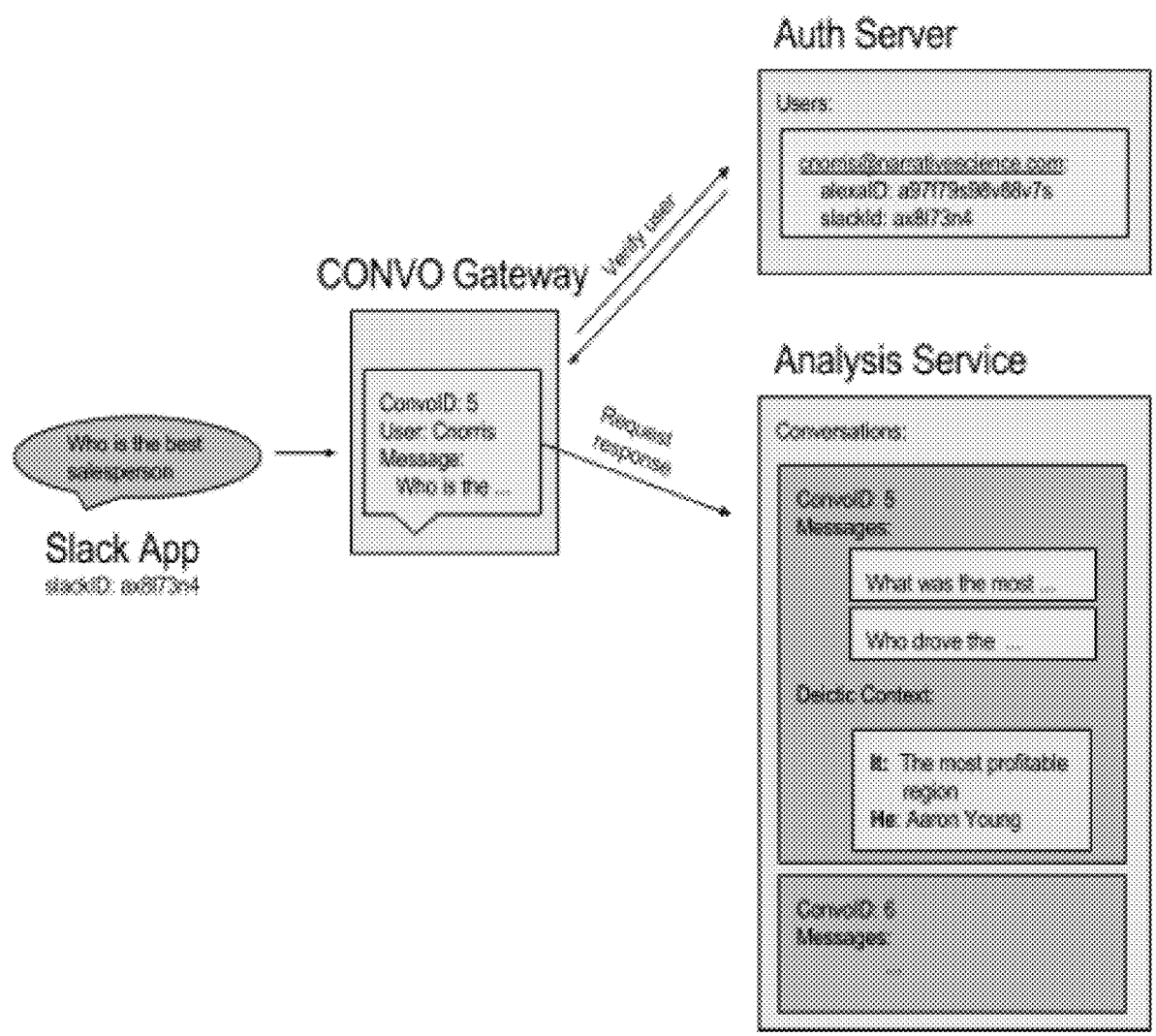
FIG. 2 discloses an example conversational gateway arrangement.

The conversational gateway 102 handles user authentication, input standardization, and coordination with an analysis service provided by the AI platform 104. An example embodiment of the conversational gateway 102 is shown by FIG. 2. In this example, the AI platform 104 can have a set of authorized users with associated user IDs, and a third party conversational interface 124 such as a Slack interface can also have a set of authorized users with associated user IDs. One of the tasks that can be performed by the conversational gateway 102 can include mapping the conversational interface user ID to the AI platform user ID and verifying that such a user has the appropriate permissions for accessing project data in the AI platform 104. AI platform 104 can maintain different sets of project data for use with different conversations. Thus, a first set of users can access a first set of project data relating to sales by salespeople of Company X in order to learn more about this sales data through the techniques disclosed herein, while a second set of users can access a second set of project data relating to home sales in several neighborhoods of a city in order to learn more about these home sales through the techniques disclosed herein. Each set of project data can have its own set of authorized users, and the conversational gateway 102 can manage user verification in coordination with an authorization server or the like as shown by FIG. 2.

The conversational gateway 102 can also standardize the messages 130 from the various channels into a standardized message 132 as shown by FIG. 1 that is provided to the analysis service of the AI platform 104. In this fashion, any formatting differences between different channels can be removed from the perspective of the AI platform 104. The conversational gateway 102 can also associate the different messages with a conversation identifier so that the system can track which messages go with which conversation sessions. For example, a unique conversation ID can be assigned to each conversation that is active with the AI platform 104 (see ConvoID in FIG. 2), and the conversational gateway 102 can tag a message 130 from a user who is logged into a particular conversation with the conversation ID for that conversation. This allows the AI platform 104 to know which conversation context to access when processing a message. Hence, a message from user Cnorris ("Who is the best salesperson?) can be tagged with a conversation ID of ConvoID 5.

The analysis service can maintain conversation session objects for each conversation it is having with one or more channels. Each conversation session object can be associated with a conversation ID and can track several aspects of a conversation, including (1) data about the users who are logged into the conversation, (2) links to the corresponding project data stored by or accessible to the AI platform 104, (3) a list of all messages in the conversation string, (4) a clarification stack for resolving ambiguities in the conversational strings, and (5) a linguistic or deictic context for the conversation. This linguistic/deictic context can help the system know how to map referring terms such as pronouns to specific entities that are mentioned in the conversation stream (see the Deictic Context table in FIG. 2). Examples of technology that can be used to build such a linguistic/deictic context are described in (1) U.S. patent application 62/612,820, filed Jan. 2, 2018, and entitled "Context Saliency-Based Deictic Parser for Natural Language Generation and Natural Language Processing", (2) U.S. patent application 16/233,746, filed Dec. 27, 2018, and entitled "Context Saliency-Based Deictic Parser for Natural Language Generation", and (3) U.S. patent application 16/233,776, filed Dec. 27, 2018, and entitled "Context Saliency-Based Deictic Parser for Natural Language Processing", the entire disclosures of each of which are incorporated herein by reference. The conversation session objects may also cache a named entity recognition tree (such as the prefix tree described below with reference to FIG. 4B) so that such a tree need not be re-built for each use. At runtime, when the analysis service receives a new message needing a response from the conversational gateway 102, the analysis service can invoke the NLP system 106 and NLG system 108 to process the message and generate an appropriate response.

Returning to FIG. 1, the NLP system 106 receives a (standardized) message 132 that includes a plurality of words arranged in a natural language format. The NLP system 106 maps this message to an existing conversation session (or creates a new conversation session if the message represents the start of a new conversation). From there, the NLP system 106 parses the message 132 to extract its meaning so that the NLG system 108 is able to formulate a message response 136. To aid the NLP system 106 in this regard, the NLP system 106 can access supporting data 110. This supporting data 110 can include the project data that serves as a knowledge base for the AI platform 104. After extracting meaning from the message 132, the NLP system 106 can provide control instructions 134 to the NLG system 108. These control instructions 134 can guide the NLG system 108 with respect to how an appropriate response 136 to the message can be generated. Supporting data 110 can also be accessed by the NLG system 108 to aid these operations. Thereafter, the conversational gateway 102 can act as a traffic manager to route the message response 136 to the appropriate channels (e.g., the channel that had submitted the message 130 from which that message response 136 was generated) via responses 138. The conversational gateway 102 may also perform any formatting translations on message responses 136 that may be necessary for the various channels to understand the message responses 138.

Advanced NLP:

As mentioned above, the NLP system 106 employs improved parsing techniques for extracting meaning from natural language messages. These parsing techniques are compositional rather than relying on templates (where templates are the conventional technique used in the art). This provides users with much more flexibility in formulating their natural language messages in a manner that can be appropriately understood by the NLP system 106. Conventional NLP systems are much less robust when it comes to understanding freely-formed natural language messages because such conventional NLP systems are only capable of understanding natural language messages that fit within predefined templates, which requires the building of large and complex sets of templates and template matching procedures in order to support a wide array of natural language expressions. Instead, the NLP system 106 disclosed herein can understand natural language messages by composing the meanings of words and phrases from the messages together hierarchically in a manner that is more consistent with formal semantic modeling. The NLP system 106 can leverage knowledge base supporting data 110 such as ontologies and linguistic context to understand the expressions that the user naturally uses in the messages in concert with syntactic information provided by natural language parsing techniques to understand how those words and phrases interact with each other.

Figure 3A:
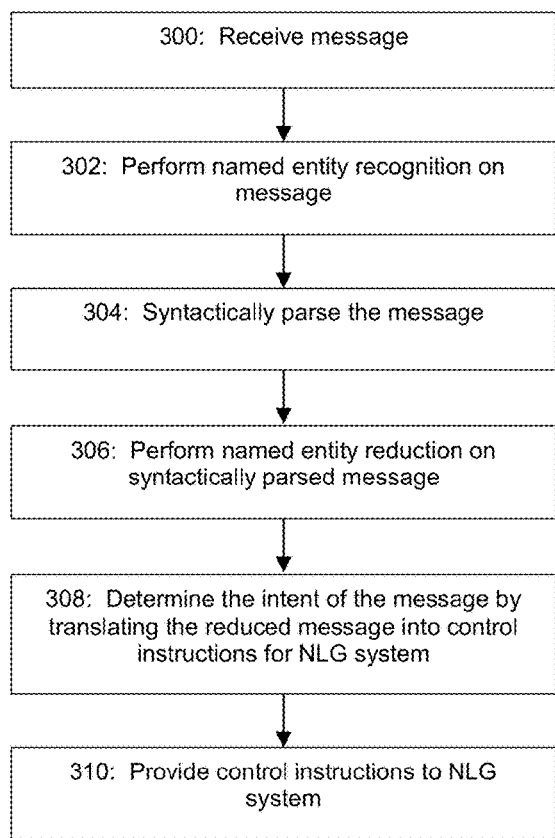
FIG. 3A discloses an example NLP process flow for translating a conversational string input into control instructions for an NLG system.

FIG. 3A depicts an example process flow for the NLP system 106 to understand the meaning of a natural language message 132 and then control the NLG system 108 based on this understood meaning. At step 300, the NLP system 106 receives a message 132, which as mentioned can take the form of a plurality of words arranged in a natural language format. As mentioned, this message 132 can be tied to a particular conversation session which will have its associated conversation session object and supporting knowledge base data 110.

Steps 302-308 operate to extract the meaning from the received message. At step 302, the system performs named entity recognition (NER) on the received message. This NER step determines the meaning of words within the message based on how those words fit within the knowledge base of the conversation. At step 304, the system syntactically parses the named entities within the context of the message to determine a hierarchical syntactic structure of the message. Then, at step 306, the system reduces the syntactically parsed message by composing individual components of the message together into higher level groupings based on the message components' hierarchy. This reduced expression of the message can then be used to determine the ultimate intent of the message (step 308), and this intent can be translated into control instructions 134 for the NLG system 108. At step 310, these control instructions 134 are provided to the NLG system 108. As an example, the FIG. 3A process flow may interpret a message such as "What is Acme Corp.'s revenue this year?" to have a meaning that is understood as a request to "Present the value of an attribute of an entity in a timeframe, where the attribute is revenue, where the entity is Acme Corp., and where the timeframe is 2018". This understood meaning can be translated to control instructions for the NLG system 108, such as a parameterized communication goal statement that represents the understood meaning.

Named Entity Recognition (NER):

FIG. 4A discloses an example process flow for performing NER at step 302 of FIG. 3A. As used herein, the term "named entity" refers to any ontological or data atom that the NLP system 106 recognizes in a message. As such, it should be understood that the term named entity refers to more than just the entities that are described as part of an ontology 410 within the supporting data 110. Examples of different types of named entities can include entity types (e.g., salesperson), entity instances (e.g., John, who is an instance of a salesperson), attributes (e.g., sales, which are an attribute of a salesperson), attribute values, timeframes, relationship types, relationships, qualifiers, outcomes, entity bindings, and predicate bindings.

At step 400 of FIG. 4A, the system builds a tree structure that can be used for recognizing named entities in the message, for example a prefix tree. This tree can pull information from the knowledge base such as the sources shown in FIG. 4A, which may include an ontology 410, project data 412, linguistic/deictic context 414, and general knowledge 416. The ontology 410 can be the ontology for a data set addressed by the message, and examples of such an ontology are described in U.S. patent applications Ser. Nos. (1) 62/585,809 (entitled "Applied Artificial Intelligence Technology for Narrative Generation Based on Smart Attributes and Explanation Communication Goals", filed Nov. 14, 2017), (2) 16/183,230 (entitled "Applied Artificial Intelligence Technology for Narrative Generation Based on Smart Attributes", filed Nov. 7, 2018), and (3) 16/183,270 (entitled "Applied Artificial Intelligence Technology for Narrative Generation Based on Explanation Communication Goals", filed Nov. 7, 2018), the entire disclosures of each of which are incorporated herein by reference. By sharing an ontology 410 between the NLP system 106 and the NLG system 108, the AI platform 104 advantageously integrates the NLP tasks with the NLG tasks so that (1) the NLP system 106 does not draw any conclusions that cannot be understood by the NLG system 108 and (2) the NLG system 108 does not produce any responses that are irrelevant to the meanings of the messages interpreted by the NLP system 106. The project data 412 represents the data set that serves as the subject of the conversation. For example, the project data 412 can be the sales data for the salespeople of a company. Thus, the project data 412 may include a number of entity instances and attribute values for the entity types and attributes of the ontology 410. The deictic context 414 can be a data structure that maps referring terms such as pronouns and demonstratives to specific named entities in the supporting data 110 (see the above-referenced and incorporated '820, '746, and '776 patent applications). As mentioned above, the above-referenced and incorporated '820, '746, and '776 patent applications describe technology that can be used to build and track this deictic context 414. The general knowledge 416 can be a data structure that identifies the words that people commonly use to describe data and timeframes (e.g., "highest", etc.). Step 400 can operate to read through these data sources and extract each unique instance of a named entity that is found to be present in the data sources, and build the prefix tree that allows the system to later recognize these named entities in the words of a message and then map those named entities to elements in the ontology 410, project data 412, deictic context 414, and/or general knowledge that are understood by the system. Also, if desired by a practitioner, it should be understood that step 400 can be performed as a pre-processing step that happens before any message is received by the NLP system 106.

FIG. 4B shows a simple example of a prefix tree that can be built as a result of step 400. It should be understood that for most projects, the prefix tree would be much larger. In this example, it can be seen that the name "Aaron Young" was found in the knowledge base of data sources as an entity instance, the word "generate" was found in the knowledge base of data sources as an attribute of sales value, the pronoun "he" was found to be contextually relevant to the entity instance of Aaron Young, and so on for other named entities as shown by FIG. 4B. Given that the ontology 410 may include a variety of different expressions for ontological elements (as described in the above-referenced and incorporated '809, '230, and '270 patent applications), it should be understood that the prefix tree can be highly robust at recognizing the meaning of a large number of words within the context of a conversation with respect to project data 412. For example, expressions such as "sales", "sells", "deals", "moves", "transactions", etc. can be linked to an attribute such as the sales of a salesperson to allow the system to recognize a wide variety of words in messages that relate to sales data. In general, it can be expected that (1) nouns will often map to entity types, entity instances, characterizations, attributes, and qualifiers, (2) verbs will often map to attributes and relationships, (3) adjectives will often map to qualifiers and characterizations, and (4) prepositions will often map to relationships; however this need not always be the case and will depend on the nature of the data sources accessed by step 400. Then, step 402 performs NER by mapping words in the message to named entities in the prefix tree. Thus, if the word "Aaron" appears in the message, this can be recognized and mapped via the prefix tree to the entity instance of Aaron Young, and if the word "generate" appears in the message, this can be recognized and mapped via the prefix tree to the attribute of sales value. In doing so, NER step 302 contextualizes the meanings of the words in the message 132 with respect to the knowledge base, which thereby allows the NLP and NLG systems to better understand a user's message intent in a meaningful fashion.

From this point on in the NLP process, the NLP system 106 can operate on named entities, which can be beneficial in making the remaining parsing steps less dependent on the precise words that were included in the message. This allows the NLP system 106 to operate on the level of meaning rather than specific word choice, which in turn means the NLP system 106 can capture a huge variety of phrasing using a common mechanism.

For example, if a conventional templated approach were used, asking for the top ranked entity by some attribute would require a different pattern match to be generated for every nuanced phrasing that the user might want to use, some examples of which could be:

What was the most profitable product?
Which product was the best by profit?
Which product brought in the most?
What was the top product in terms of profit?

These are just a few examples of different ways that a user might phrase a question with the same basic meaning. However, the inventors note that each of these examples contains the same three named entities:

EntityType(Product) via "product";
Attribute(Profit) via "profit", "most profitable", "brought in";
Qualifier(TopRanked) via "most profitable", "best", "most", "top"

Thus, what would be four lexically distinct sentences to a template parser are handled as the same case by the semantic parsing of the inventive NLP system 106 disclosed herein. By operating on the level of meaning rather than word choice, the NLP system 106 does not need to rely on word-specific templates to decipher the user's intent from a message.

Syntactic Parsing:

The NLP system 106 also determines the meaning of a message from the underlying syntactic structure of the message. However, because the message comes in as a flat list of words, step 304 employs syntactic parsing to determine a hierarchical linguistic structure of the message. In an example embodiment, the syntactic parsing at step 304 can employ a constituency parse. However, it should be understood that other parsing techniques could be used, such as dependency parse.

Figure 5A:
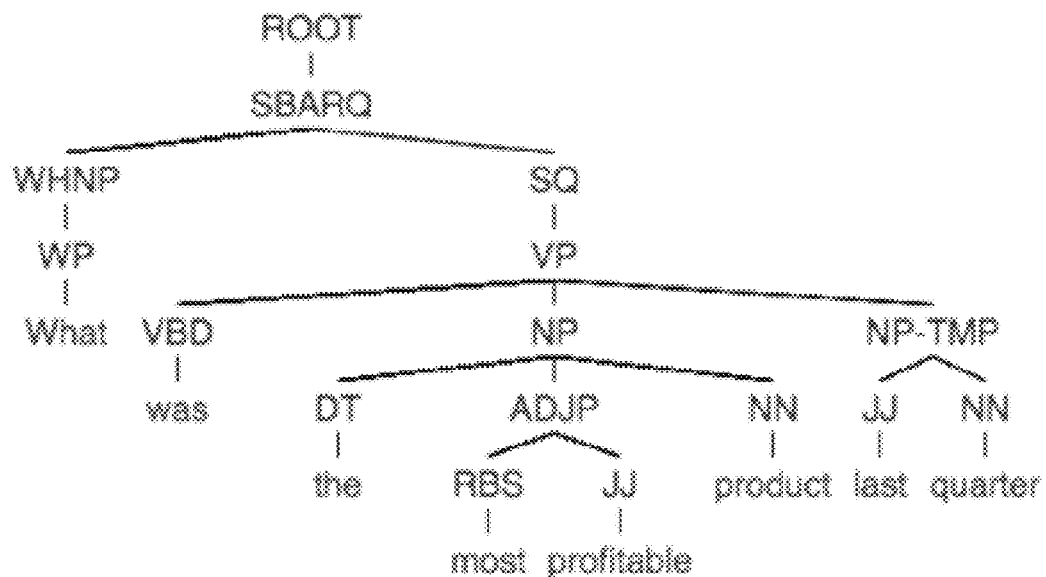
FIG. 5A discloses an example of syntactic parsing for the process flow of FIGS. 3A and 3B using a constituency parse.

Available third party solutions can be used to perform the syntactic parsing at step 304. For example, Stanford's CoreNLP engine can be used to perform a constituency parse that identifies the grammatical structure of the message. Another example of a syntactic parser that can be used for constituency parsing is SyntaxNet from TensorFlow. FIG. 5A shows an example of a message that has been parsed via a constituency parse. As shown by FIG. 5A, the different elements of the message are tagged with grammatical identifiers, and these grammatical identifiers act in concert with each other to define a linguistic or grammatical hierarchy for the sentence components (where the abbreviation labels in FIG. 5A correspond to well-known linguistic and grammatical classifications in the art such as types of subjects, objects, verbs, etc.)

Figure 5B:
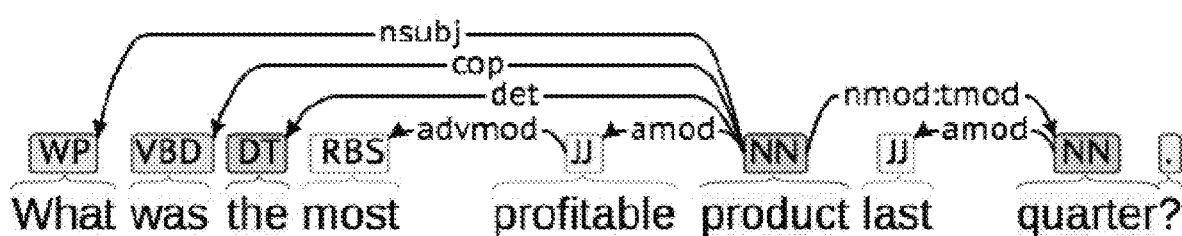
FIG. 5B discloses an example of syntactic parsing for the process flow of FIGS. 3A and 3B using a dependency parse.

FIG. 5B shows an example of the same message from FIG. 5A that has been parsed via a dependency parse. Stanford's CoreNLP engine and TensorFlow's SyntaxNet parser can also perform dependency parsing. Dependency parsing reveals how the words functionally interact with each other within the message. Similar to the constituency parse of FIG. 5A, the dependency parse of FIG. 5B also reveals a hierarchical relationship among the grammatical components of the message.

Thus, step 304 operates to convert the flat list of named entities that were recognized at step 302 into a hierarchical arrangement of those named entities, which allows for the NLP system to further extract meaning from the message.

Reduction:

Now that the NLP system knows the hierarchical structure of the message and its words have been tagged with their meanings via NER, step 306 can operate to further extract meaning from the message by composing the named entities together hierarchically. Step 306 thus operates as a filter that reduces a message to a core meaning. This process can be grounded in the principle of compositionality, which posits that the meaning of a phrase is a composition of the meanings of its components via a rule set.

Figures 6A, 6B:
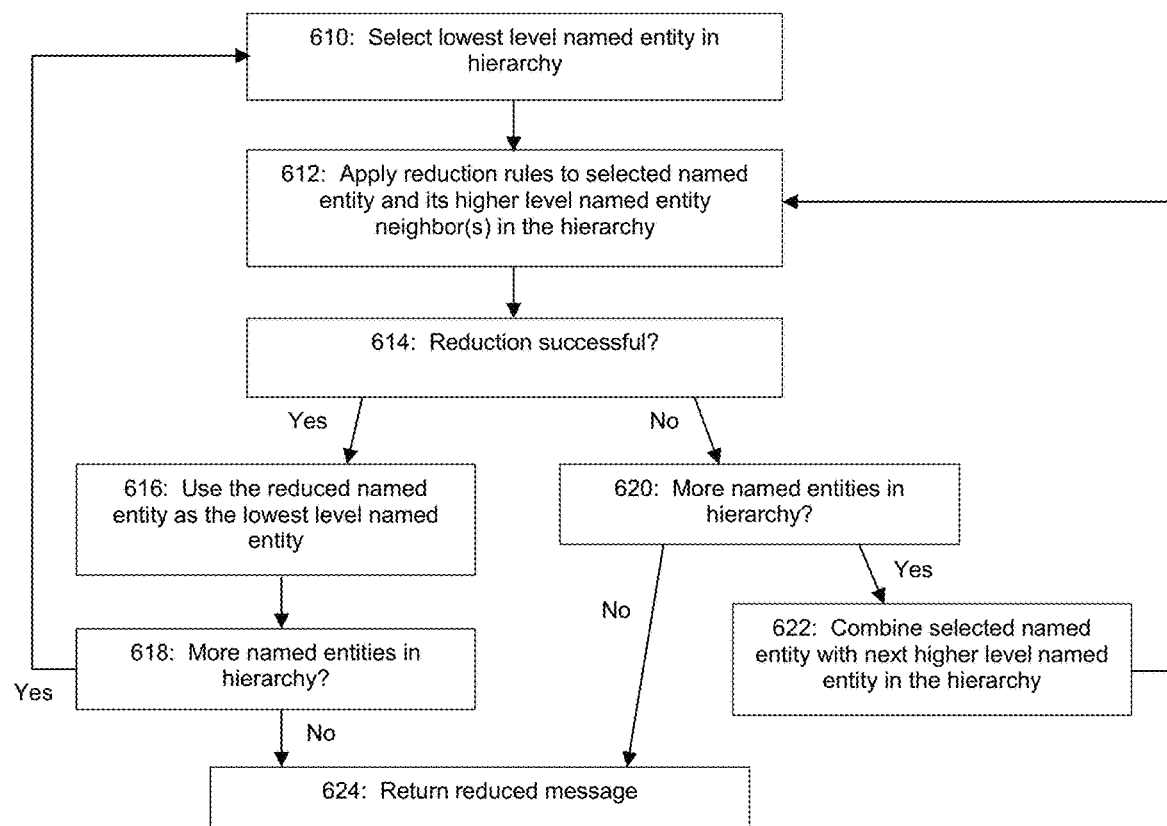
FIG. 6A discloses an example set of reduction rules for performing named entity reduction on named entities in a conversational input string.
FIG. 6B discloses an example process flow for performing named entity reduction on named entities in a conversational input string.

FIG. 6A depicts an example rule set that can be used by the reducing step 306. This example rule set includes 4 reduction rules 602, 604, 606, and 608. These rules can be typed functions that convert lists of named entities into an aggregated named entity, wherein the aggregated named entity includes one or more named entities. Rule 602 operates to reduce the combination of an entity with a rank qualifier and an attribute to an aggregated named entity that is a new entity. Thus, rule 602 will operate to aggregate a combination of named entities of the types ENTITY, RANK QUALIFIER, and ATTRIBUTE into an aggregated named entity of the type ENTITY. Rule 604 operates to reduce the combination of a relationship type and an entity to an aggregated named entity that is a new relationship. Thus, rule 604 will operate to aggregate a combination of named entities of the types RELATIONSHIP TYPE and ENTITY into an aggregated named entity of the type RELATIONSHIP. Rule 606 operates to reduce the combination of an entity and a relationship to an aggregated named entity that is a new entity. Thus, rule 606 will operate to aggregate a combination of named entities of the types ENTITY and RELATIONSHIP into an aggregated named entity of the type ENTITY. Rule 608 operates to reduce an entity type to an aggregated named entity that is a new entity. Thus, rule 608 will operate to convert a named entity of the type ENTITY TYPE into an aggregated named entity of the type ENTITY.

FIG. 6B shows how these rules can be applied during a reduction operation, and as shown by FIG. 6B, the hierarchy of the message will impact the reduction process.

Figure 6C:
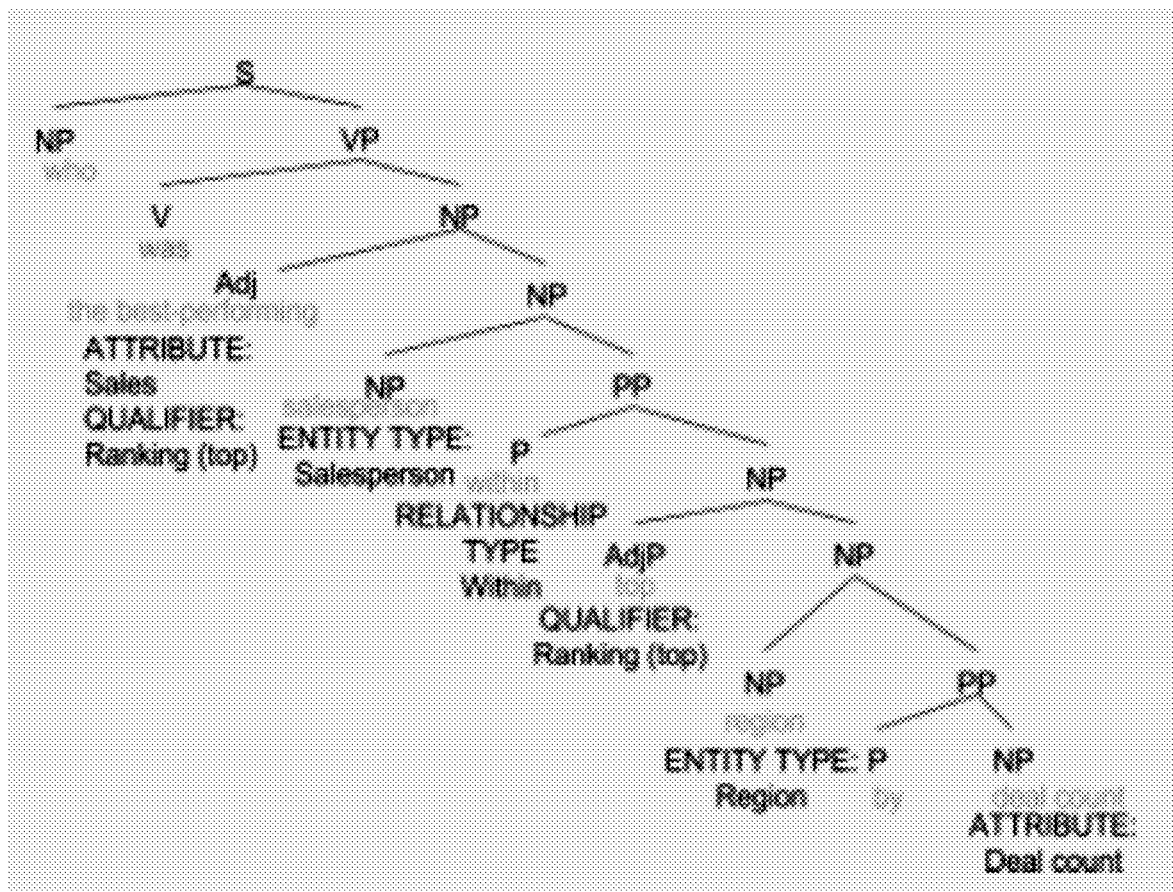
FIGS. 6C-6G disclose how named entity reduction can operate to reduce a sample hierarchically parsed conversational input string.
Figure 6D:
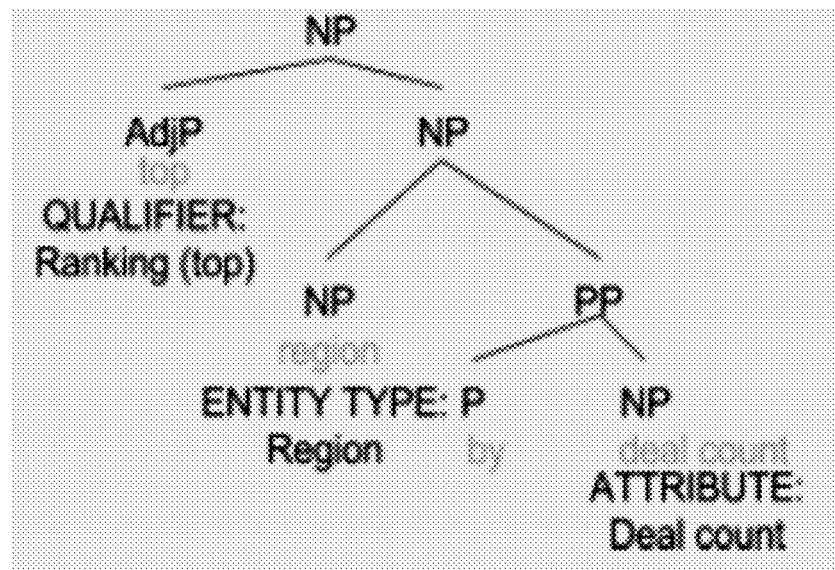
Figure 6E:
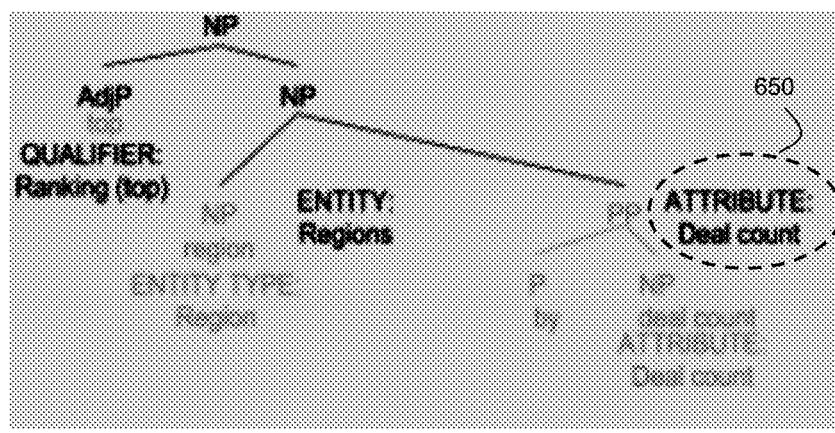
Figure 6F:
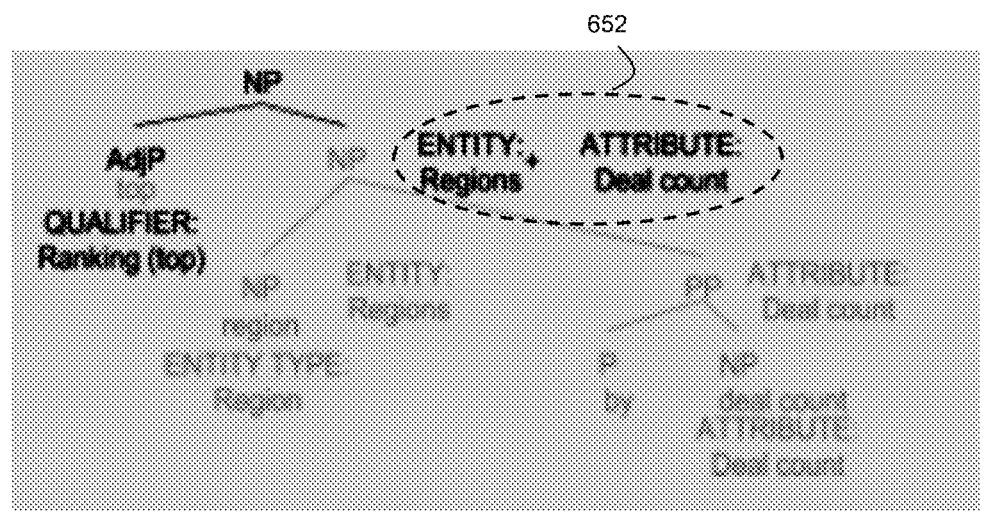

At step 610, the lowest level named entity in the hierarchy is selected. With reference to the example syntax tree hierarchy of named entities from FIG. 6C (which corresponds to the message "Who was the best-performing salesperson within the top region by deal count?" and where FIG. 6D focuses on the lower levels of this hierarchy), step 610 would begin by selecting the named entity "deal count" which is at the lowest level of the hierarchy (see 650 in FIG. 6E, and where the preposition "by" is ignored as it had not been mapped to a named entity). This named entity is an ATTRIBUTE, as shown by FIGS. 6C, 6D, and 6E.

Then, at step 612, the system applies the reduction rules to the selected named entity and its higher level named entity neighbor(s) in the hierarchy. Returning to FIGS. 6C, 6D, and 6E, the next higher level named entity in the hierarchy is "region" which is an ENTITY TYPE as shown by FIG. 6C. This results in a combination of ENTITY TYPE +ATTRIBUTE (see 652 in FIG. 6F). Given that there is no reduction rule applicable to the combination of ENTITY TYPE +ATTRIBUTE, this means that step 614 will conclude that reduction was not successful. As such, the process flow proceeds to step 620 where the process looks to see if there is another named entity in the hierarchy. If so, at step 622, the system combines the selected named entity with the next higher level named entity in the hierarchy and returns to step 612. With reference to FIGS. 6C-F, this results in the combination of ENTITY TYPE +ATTRIBUTE +RANK QUALIFIER (see FIG. 6D). At step 612, this combination causes rule 602 to fire, which means that step 614 causes a transition to step 616.

Figure 6G:
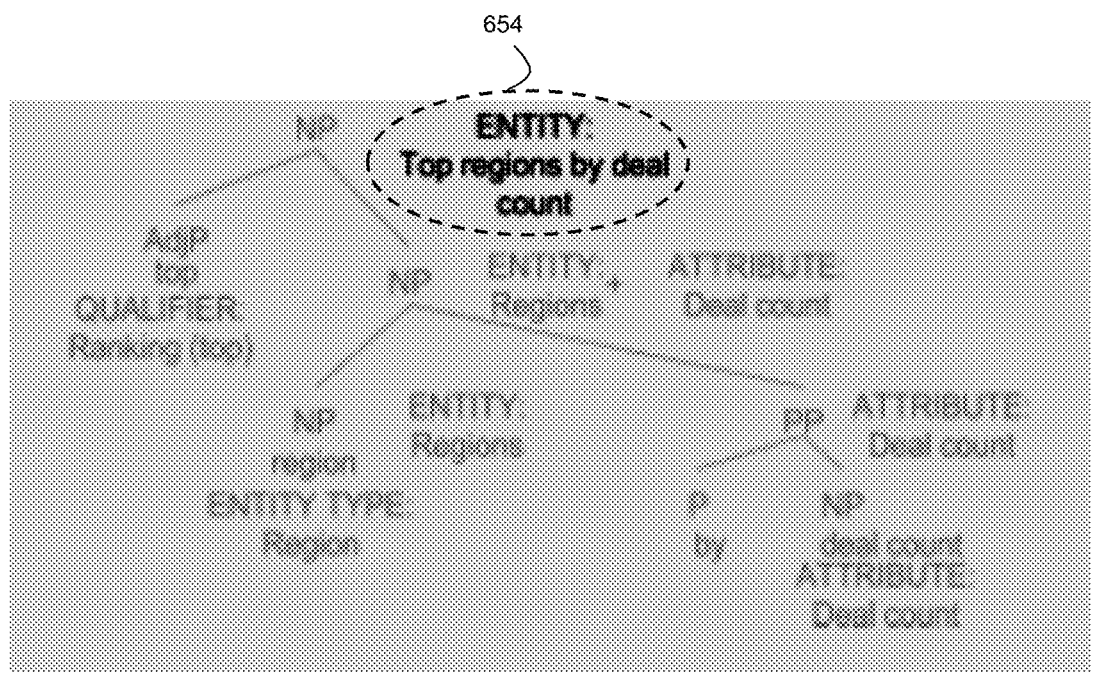

At step 616, the system uses the aggregated named entity created by rule 602, and this aggregated named entity now serves as the lowest level named entity in the hierarchy (where this aggregated named entity corresponds to the "Top Region by Deal Count" which has a type of ENTITY). FIG. 6G shows the reduced hierarchy where the lower levels are collapsed into the aggregated named entity of "top region by deal count" (see 654 in FIG. 6G).

Next, at step 618, the system checks whether there are any more higher level named entities in the hierarchy. If so, the process flow returns to step 610 where the aggregated named entity from step 616 is selected as the lowest level named entity in the hierarchy. The process flow then repeats until the remaining named entities in the hierarchy cannot be further reduced (see the transition from step 618 to 624 and the transition from step 620 to 624). At step 624, the process flow returns the reduced message in the form of the maximally reduced set of named entities according to the reduction rules.

Thus, as the process flow continues with the example of FIG. 6C, it should be understood that the reduction rules would operate to further reduce the message to the aggregated named entity of the type ENTITY ("the best-performing salesperson within the top region by deal count").

Thus, it should be understood that the NLP system, for the purpose of extracting meaning, no longer cares about the specific phrases in a message, because all it needs to know is that a message phrase represents an entity (or some other aggregated named entity as defined by the reduction rules) without being concerned about how it got there. The composability of this reduction paradigm means that the NLP system 106 can hypothetically parse arbitrarily nested entity filters.

For example, the string of "The most productive employee in the worst-performing state in the region that I live in" would appear to the reduction step 306 as:

"The region that I live in" is REGION (with particular characteristics), which yields "The worst-performing state in REGION"

"The worst-performing state in REGION" is STATE (with particular characteristics), which yields "The most productive employee in STATE"

"The most productive employee in STATE" is EMPLOYEE (with particular characteristics).

Thus, the reduction step 308 can extract the meaning from the question "Who is the most productive employee in the worst-performing state in the region that I live in" to conclude that the user is asking about EMPLOYEE (with particular characteristics).

Intent:

After the message has been reduced by step 306, the NLP system determines the intent of the message via step 308. This intent can serve as the extracted meaning for the message. The intent determination can operate in a manner similar to the reduction step, but whereas the reduction step 306 converts combinations of named entities into aggregated named entities, the intent determination step 308 converts aggregated named entities into control instructions 134 for the NLG system 108. These control instructions 134 can take the form of an outline or parameterized communication goal statement for the NLG system 108.

FIG. 7A shows examples of rules that can be used by step 308 to map aggregated named entities from reduced messages to intents. The intents can be represented by communication goal statements that represent the intent of the message, which in an interactive conversation will often be a request for specific information. For example, rule 702 can map an aggregated named entity of ENTITY to a parameterized communication goal statement of CalloutEntity (ENTITY). Rule 704 maps an aggregated named entity plus ATTRIBUTE to a parameterized communication goal statement of PresentValue(ENTITY, ATTRIBUTE). Rule 706 maps an aggregated named entity plus ATTRIBUTE plus QUALIFIER(DRIVER) to a parameterized communication goal statement of Explain(ENTITY, ATTRIBUTE, DRIVER). Rule 708 maps an aggregated named entity plus ATTRIBUTE plus QUALIFIER(CHANGE) plus TIMEFRAMES 1 and 2 (for the change) to a parameterized communication goal statement of PresentChange(ENTITY, ATTRIBUTE, CHANGE, TIMEFRAMES). Rule 710 maps an aggregated named entity plus ATTRIBUTE plus QUALIFIER(CHANGE) plus QUALIFIER(DRIVER) plus TIMEFRAMES 1 and 2 (for the change) to a parameterized communication goal statement of ExplainChange(ENTITY, ATTRIBUTE, CHANGE, DRIVER, TIMEFRAMES).

FIG. 7B shows an example process flow for step 308. At step 720, the system maps the reduced message to an intent based on the mapping rules (see FIG. 7A). At step 722, the system instantiates the parameterized communication goal statement that was identified via the mapping rules. Thus, if a message is reduced to a single aggregated named entity of ENTITY, this would result in the use of the parameterized communication goal statement of CalloutEntity(ENTITY) as the control instructions 134 for the NLG system 108. Thus, step 308 would conclude that a message such as "Which salesperson brought in the most money?" to have an intent/meaning of "Callout the entity which has specific characteristics (namely, the salesperson with the largest value of sales)". Similarly, if a message is reduced to the named entity combination of ENTITY + ATTRIBUTE, this would result in the use of the parameterized communication goal statement of PresentValue(ENTITY, ATTRIBUTE) as the control instructions 134 for the NLG system 108. Thus, step 308 in this example would conclude that a message such as "What is Acme Corp.'s revenue this year?" to have an intent/meaning of "Present the value of an attribute of an entity in a timeframe (where the attribute is revenue, where the entity is Acme Corp., and where the timeframe is 2018").

Figure 3B:
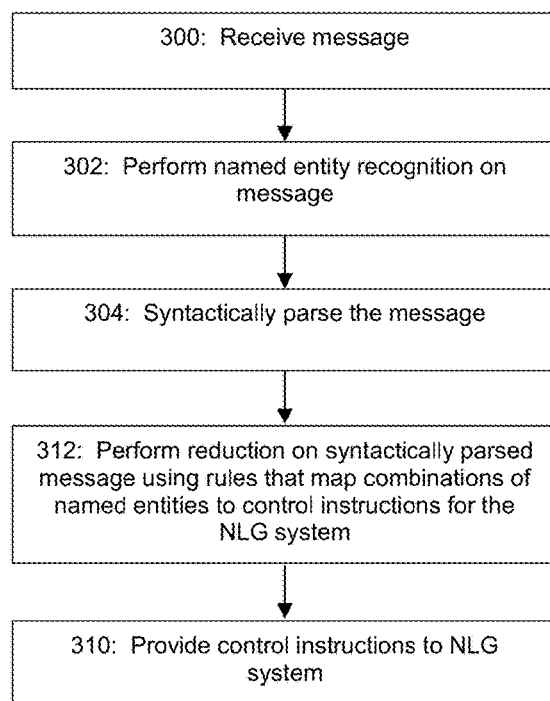
FIG. 3B discloses another example NLP process flow for translating a conversational string input into control instructions for an NLG system.

The inventors note that a practitioner may choose to combine steps 306 and 308 together by merging the rules supporting steps 306 and 308 so that the reduction operation reduces the hierarchical arrangement of named entities into the determined intents (e.g., parameterized communication goal statements). An example embodiment of such a process flow is shown by FIG. 3B. In FIG. 3B, steps 306 and 308 are replaced by a step 312 that reduced the reduces the hierarchical arrangement of named entities to the NLG control instructions via such merged rules.

NLP-Dependent NLG:

The NLG system 108 then operates on the control instructions 134 (e.g., a parameterized communication goal statement) that are produced as a result of step 722 to produce the message response 136. An example of NLG technology that can be used as the NLG system 108 is the QUILL™ narrative generation platform from Narrative Science Inc. of Chicago, Ill. Aspects of this technology are described in the following patents and patent applications: U.S. Pat. Nos. 8,374,848, 8,355,903, 8,630,844, 8,688,434, 8,775,161, 8,843,363, 8,886,520, 8,892,417, 9,208,147, 9,251,134, 9,396,168, 9,576,009, 9,697,178, 9,697,197, 9,697,492, 9,720,884, 9,720,899, 9,977,773, 9,990,337, and 10,185,477; and U.S. patent application Ser. Nos. 15/253,385 (entitled "Applied Artificial Intelligence Technology for Using Narrative Analytics to Automatically Generate Narratives from Visualization Data, filed Aug. 31, 2016), 62/382,063 (entitled "Applied Artificial Intelligence Technology for Interactively Using Narrative Analytics to Focus and Control Visualizations of Data", filed Aug. 31, 2016), 15/666,151 (entitled "Applied Artificial Intelligence Technology for Interactively Using Narrative Analytics to Focus and Control Visualizations of Data", filed Aug. 1, 2017), 15/666,168 (entitled "Applied Artificial Intelligence Technology for Evaluating Drivers of Data Presented in Visualizations", filed Aug. 1, 2017), 15/666,192 (entitled "Applied Artificial Intelligence Technology for Selective Control over Narrative Generation from Visualizations of Data", filed Aug. 1, 2017), 62/458,460 (entitled "Interactive and Conversational Data Exploration", filed Feb. 13, 2017), 15/895,800 (entitled "Interactive and Conversational Data Exploration", filed Feb. 13, 2018), 62/460,349 (entitled "Applied Artificial Intelligence Technology for Performing Natural Language Generation (NLG) Using Composable Communication Goals and Ontologies to Generate Narrative Stories", filed Feb. 17, 2017), 15/897,331 (entitled "Applied Artificial Intelligence Technology for Performing Natural Language Generation (NLG) Using Composable Communication Goals and Ontologies to Generate Narrative Stories", filed Feb. 15, 2018), 15/897,350 (entitled "Applied Artificial Intelligence Technology for Determining and Mapping Data Requirements for Narrative Stories to Support Natural Language Generation (NLG) Using Composable Communication Goals", filed Feb. 15, 2018), 15/897,359 (entitled "Applied Artificial Intelligence Technology for Story Outline Formation Using Composable Communication Goals to Support Natural Language Generation (NLG)", filed Feb. 15, 2018), 15/897,364 (entitled "Applied Artificial Intelligence Technology for Runtime Computation of Story Outlines to Support Natural Language Generation (NLG)", filed Feb. 15, 2018), 15/897,373 (entitled "Applied Artificial Intelligence Technology for Ontology Building to Support Natural Language Generation (NLG) Using Composable Communication Goals", filed Feb. 15, 2018), 15/897,381 (entitled "Applied Artificial Intelligence Technology for Interactive Story Editing to Support Natural Language Generation (NLG)", filed Feb. 15, 2018), 62/539,832 (entitled "Applied Artificial Intelligence Technology for Narrative Generation Based on Analysis Communication Goals", filed Aug. 1, 2017), 16/047,800 (entitled "Applied Artificial Intelligence Technology for Narrative Generation Based on Analysis Communication Goals", filed Jul. 27, 2018), 16/047,837 (entitled "Applied Artificial Intelligence Technology for Narrative Generation Based on a Conditional Outcome Framework", filed Jul. 27, 2018), 62/585,809 (entitled "Applied Artificial Intelligence Technology for Narrative Generation Based on Smart Attributes and Explanation Communication Goals", filed Nov. 14, 2017), 16/183,230 (entitled "Applied Artificial Intelligence Technology for Narrative Generation Based on Smart Attributes", filed Nov. 7, 2018), and 16/183,270 (entitled "Applied Artificial Intelligence Technology for Narrative Generation Based on Explanation Communication Goals", filed Nov. 7, 2018), the entire disclosures of each of which are incorporated herein by reference.

As explained in the above-referenced and incorporated '809, '230, and '270 patent applications, the NLG system can employ a conditional outcome framework to determine the ideas that should be expressed in the narrative that is produced in response to the parameterized communication goal statement (where this narrative can then serve as the message response 136). FIG. 8 shows an example data structure that can define such a conditional outcome framework for the class Drivers, which can serve as an intent class for driver analysis. Thus, each intent class can be responsible for choosing the ideas that will satisfy the subject intent. This can be done by generating an outline via an NLG library. As defined by FIG. 8, the generate outline call conditionally triggers with an idea set corresponding to an Explain communication goal (see the above-referenced and incorporated '809, '230, and '270 patent applications) if the entity is singular or with an idea set corresponding to an Analyze communication goal (see the above-referenced and incorporated '809, '230, and '270 patent applications) if the entity is plural. This means that the same intent can be used to answer both of the following questions:

What drove the change in revenue for my product from last year to this year?

What drove the change in velocity for the engineers from last sprint to this sprint?

Once the ideas have been generated by the conditional outcome framework of the NLG system 108, the NLG system can then form these ideas into a narrative using the techniques described in the above-referenced and incorporated '809, '230, and '270 patent applications to generate the message response 136.

FIG. 9 shows an example conversation string that can be produced by the inventive combination of NLP with NLG as described with respect to example embodiments above.

This conversation string can begin with the message 900. The NLP system 106 can process this message 900 using the process flow of FIG. 3A to extract a meaning for the message that can be understood by the NLG system 108. Thus, the NLP system can associate words in the message 900 with named entities from the knowledge base such as ("Acme Corp.'s" -> ENTITY), (revenue -> ATTRIBUTE), ("this year" -> TIMEFRAME). The syntactic parsing, reduction, and intent determination steps would then operate to extract as the meaning of the message 900 as a parameterized communication goal statement of "Present the value of the attribute of the entity during the timeframe, where the entity is Acme Corp., where the attribute is revenue, and where the timeframe is 2018". The NLG system 108 would then process this parameterized communication goal statement using the techniques described in the above-referenced and incorporated '809, '230, and '270 patent applications to produce the message response 902. This conversation string can then continue with message 904 and its response 906, with message 908 and its response 910, with message 912 and its response 914, with message 916 and its response 918, with message 920 and its response 922, and with message 924 and its response 926. As these messages and responses are added to the conversation string, it should be understood that the deictic context for the conversation string can be updated accordingly as described in the above-referenced and incorporated '820, '746, and '776 patent applications. Thus, the deictic context can inform the NLP system 106 that "it" in message 908 refers to the context-salient entity of the product "Model X" from the prior response 906. However, as can be seen at response 926, the context-saliency for the pronoun "it" has changed by the time that response 926 is generated, in which case the deictic context for "it" has been updated to refer to the category "Gaming Headsets".

Clarification and Learning:

The inventors also disclose techniques that can be used to render the AI platform capable of learning. In particular, the AI platform can include intelligence that is designed to recognize instances where clarifications regarding the meanings of words in a message are needed, and in such instances, clarification can be sought from a user in order to teach the AI platform about the meanings of words. This learning/teaching process can result in the knowledge base (such as the ontology) being updated with new words linked to ontological elements. In this fashion, when these words are later encountered, the system will be able to contextualize the meanings for such new words.

FIG. 10A depicts an example process flow for such clarification and learning. When a message is received and processed to determine its intent (step 1000; see FIG. 3A), the NLP system 106 may encounter a word in the message that it cannot match to a named entity. This may result in the system concluding that it cannot understand the message (step 1002). The clarification and learning technique can thus be programmed to trigger clarification requests when situations are encountered such as the main verb of a message is unknown, the main subject of a message is unknown, an adjective on a subject is unknown, and/or any instance where a word in the message is unknown. An example of this is shown by FIG. 10B, where the message of "Which region generated the most last year?" resulted in the system concluding that it could not understand the message because it could not match the word "generated" to a named entity. If the message cannot be understood, an entry is added to a clarification stack (step 1004) so that clarification about the unknown word can be requested.

At step 1006, the system requests clarification from the user. This step can include the system prompting the user with a question about the unknown word. This prompt can be delivered to the channel that provided the message. An example of such a prompt can be seen in FIG. 10B where the system (labeled as "Quill") asks the user "I don't know what it means to "generate", which attribute does it apply to?"

The process flow then enters a state of awaiting clarification and waits for a new message. When the user provides a response to the prompt about the unknown word, this response is received as a new message. An example of such a new message is shown by FIG. 10B as "Revenue". This new message is processed at steps 1000 and 1002 to arrive at step 1008. At step 1008, the system checks whether the process flow was in a state where it was awaiting clarification. Given that in this example, the system was awaiting clarification, the process flow would proceed to step 1010. At step 1010, the system updates the ontology with the information in the new message about the unknown word. Continuing with the example of FIG. 10B, step 1010 can result in the system adding the word "generate" to the expressions associated with the attribute "revenue".

Then, at step 1012, the system updates the clarification stack to remove the entry relating to the subject unknown word. Thereafter, upon return to step 1000, the system can now understand the message that was initially received (see step 1002). With reference to the example of FIG. 10B, because the system can now recognize the word "generated" as being tied to the named entity of revenue, this means that the intent of the message can be extracted via the FIG. 3A process flow. After step 1002, step 1008 would then conclude that the system was no longer awaiting clarification, which causes a transition to step 1014. At step 1014, the NLG system 108 generates a response message based on the meaning/intent that was extracted at step 1000. FIG. 10B shows an example of such a response message, where the system is able to inform the user of the region that generate the most revenue last year.

This clarification and learning technique can be used to teach the AI platform on the fly so that the AI platform adapts to a user's manner of expressing himself or herself. While FIG. 10B shows an example where the word "generate" is added to the expressions linked to an attribute in the ontology, it should be understood that the ontology can be taught in other fashions as well. For example, the expressions that are linked to entity types in the ontology can also be supplemented with new word (e.g., teaching the ontology that "SKU" is an expression for a "product" entity type).

Further still, aspects of the knowledge base other than ontology expressions can be updated via the clarification and learning technique. For example, the project data and/or conversation session data (e.g., deictic context) can be updated using the clarification and learning technique. As an example, the message may ask a question about "my product", but the system may not know which products belong to the person associated with "my". When the system recognizes that it does not know what "my product" is, the system can prompt the user to identify the product, and after the user notifies the system of which product is "my product", the system can update the project data and/or conversation session data to add an association between the person associated with "my" and the subject product. Thereafter, when the system is asked about that person's product in the possessive sense, it can understand the meaning. Deictic context can be updated in a similar fashion if the system is not able to understand a referring term such as a pronoun in a message.

As another example, the clarification and learning technique can be used to update the ontology new ontological objects such as new entity types, new attributes, new characterizations, etc. Accordingly, it should be understood that the techniques for updating the ontology in response to user inputs when composing communication goal statements as described in the above-referenced and incorporated '809, '230, and '270 patent applications can be extended to updating the knowledge base based on user-composed messages in the interactive NLP/NLG system.

An example of learning with respect to ontologies can be adding complex new ontological elements such as characterizations. For example, the system may not know what the word "expensive" means within a message (e.g., "Is this flight expensive?"). This system can recognize that the word "expensive" may relate to a characterization because it is an adjective. As such, the system can ask the user to define applicability conditions and thresholds that will govern how to test whether something is expensive (such as a flight). For example, the user may supply that whether something is expensive is judged on the value of an attribute such as price and that prices above a dollar amount threshold are what qualify as being deemed expensive. The user responses to this inquiry can then be added to the ontology to define the qualification criteria for evaluating whether the characterization of "expensive" is applicable to an entity such as a flight.

To focus the clarification and learning technique on how the user should be prompted for information and how the knowledge base should be updated in view of the user's response to the clarification request, the system can be programmed to associate certain grammatical classifications of words with certain types of clarification requests. For example, unknown adjectives can trigger clarification requests relating to characterizations. As another example, unknown verbs can trigger clarification requests relating to attributes. As another example, unknown nouns can trigger clarification requests relating to entity types or characterizations.

While the invention has been described above in relation to its example embodiments, various modifications may be made thereto that still fall within the invention's scope. Such modifications to the invention will be recognizable upon review of the teachings herein.

What is claimed is:

1. A computer program product for natural language processing that applies computer technology to a message to determine a meaning for the message in order to control a natural language generation (NLG) system for responding to the message, wherein the message comprises data representing a plurality of words arranged in natural language, the computer program product comprising:

a plurality of processor-executable instructions that are resident on a non-transitory computer readable storage medium, wherein the instructions are configured, upon execution by a processor, to cause the processor to:
perform named entity recognition on the words of the message to identify a plurality of named entities that correspond to words in the message based on a knowledge base of named entities;
syntactically parse the message to generate data that defines a grammatical hierarchy of the named entities within the message;
reduce the named entities within the message to a reduced aggregation of named entities based on the defined grammatical hierarchy and a plurality of reduction rules, wherein the reduced aggregation of named entities represents an inferred core meaning for the message; and
generate control instructions for the NLG system based on the reduced aggregation of named entities, wherein the control instructions comprise a plurality of configuration parameters for the NLG system that are derived from the message, and wherein the control instructions are configured to cause the NLG system to generate a natural language response that expresses a communication goal that is responsive to the inferred core meaning for the message;
wherein the instructions are further configured, upon execution by a processor, to cause the processor to apply the reduction rules to combinations of named entities in the defined hierarchy starting from a lowest named entity in the defined hierarchy and progressing toward a top named entity in the defined hierarchy;
wherein the named entities in the defined hierarchy have associated named entity types, and wherein the reduction rules define how a plurality of different combinations of named entity types are reduced into a plurality of different aggregations of named entities, wherein each aggregation of named entities also has an associated named entity type;
wherein the named entity types include an entity, an entity type, a qualifier, an attribute, a relationship, and a relationship type; and
wherein the reduction rules comprise:
a first reduction rule that reduces a combination of named entities corresponding to the entity named entity type, the qualifier named entity type, and the attribute named entity type to an aggregated named entity corresponding to the entity named entity type;
a second reduction rule that reduces a combination of named entities corresponding to the relationship type named entity type and the entity named entity type to an aggregated named entity corresponding to the relationship entity type;
a third reduction rule that reduces a combination of named entities corresponding to the entity named entity type and the relationship named entity type to an aggregated named entity corresponding to the entity named entity type; and
a fourth reduction rule that reduces one or more named entities corresponding to the entity type named entity type to an aggregated named entity corresponding to the entity named entity type.

2. The computer program product of claim 1 wherein the instructions are further configured, upon execution by a processor, to cause the processor to apply the reduction rules to combinations of adjacent named entities in the defined hierarchy starting from the lowest named entity in the defined hierarchy and progressing toward the top named entity in the defined hierarchy.

3. A natural language processing method that applies computer technology to a message to determine a meaning for the message in order to control a natural language generation (NLG) system for responding to the message, wherein the message comprises data representing a plurality of words arranged in natural language, the method comprising:
a processor performing named entity recognition on the words of the message to identify a plurality of named entities that correspond to words in the message based on a knowledge base of named entities;
a processor syntactically parsing the message to generate data that defines a grammatical hierarchy of the named entities within the message;
a processor reducing the named entities within the message to a reduced aggregation of named entities based on the defined grammatical hierarchy and a plurality of reduction rules, wherein the reduced aggregation of named entities represents an inferred core meaning for the message; and
a processor generating control instructions for the NLG system based on the reduced aggregation of named entities, wherein the control instructions comprise a plurality of configuration parameters for the NLG system that are derived from the message, and wherein the control instructions are configured to cause the NLG system to generate a natural language response that expresses a communication goal that is responsive to the inferred core meaning for the message;
wherein the reducing step comprises a processor applying the reduction rules to combinations of named entities in the defined hierarchy starting from a lowest named entity in the defined hierarchy and progressing toward a top named entity in the defined hierarchy;
wherein the named entities in the defined hierarchy have associated named entity types, and wherein the reduction rules define how a plurality of different combinations of named entity types are reduced into a plurality of different aggregations of named entities, wherein each aggregation of named entities also has an associated named entity type;
wherein the named entity types include an entity, an entity type, a qualifier, an attribute, a relationship, and a relationship type; and
wherein the reduction rules comprise:
a first reduction rule that reduces a combination of named entities corresponding to the entity named entity type, the qualifier named entity type, and the attribute named entity type to an aggregated named entity corresponding to the entity named entity type;
a second reduction rule that reduces a combination of named entities corresponding to the relationship type named entity type and the entity named entity type to an aggregated named entity corresponding to the relationship entity type;
a third reduction rule that reduces a combination of named entities corresponding to the entity named entity type and the relationship named entity type to an aggregated named entity corresponding to the entity named entity type; and
a fourth reduction rule that reduces one or more named entities corresponding to the entity type named entity type to an aggregated named entity corresponding to the entity named entity type.

4. The method of claim 3 wherein the generating step comprises:

mapping the reduced aggregation of named entities to the control instructions based on a plurality of rules that map different reduced aggregations of named entities to different control instructions for the NLG system.

5. The method of claim 3 wherein the applying step comprises a processor applying the reduction rules to combinations of adjacent named entities in the defined hierarchy starting from the lowest named entity in the defined hierarchy and progressing toward the top named entity in the defined hierarchy.

6. A natural language processing method that applies computer technology to a message to determine a meaning for the message in order to control a natural language generation (NLG) system for responding to the message, wherein the message comprises data representing a plurality of words arranged in natural language, the method comprising:
 a processor performing named entity recognition on the words of the message to identify a plurality of named entities that correspond to words in the message based on a knowledge base of named entities;
 a processor syntactically parsing the message to generate data that defines a grammatical hierarchy of the named entities within the message;
 a processor reducing the named entities within the message to a reduced aggregation of named entities based on the defined grammatical hierarchy and a plurality of reduction rules, wherein the reduced aggregation of named entities represents an inferred core meaning for the message; and
 a processor generating control instructions for the NLG system based on the reduced aggregation of named entities, wherein the control instructions comprise a plurality of configuration parameters for the NLG system that are derived from the message, and wherein the control instructions are configured to cause the NLG system to generate a natural language response that expresses a communication goal that is responsive to the inferred core meaning for the message;
 wherein the generating step comprises mapping the reduced aggregation of named entities to the control instructions based on a plurality of rules that map different reduced aggregations of named entities to different control instructions for the NLG system;
 wherein the reduced aggregation of named entities has an associated named entity type, and wherein the mapping rules map reduced aggregations of named entities to the control instructions based on the associated named entity type for the reduced aggregation of named entities; and
 wherein the associated named entity type is a combination of an entity, an attribute, and a qualifier, wherein the qualifier corresponds to a driver, and wherein the mapping rules map the entity, attribute, and driver qualifier combination named entity type to an explain communication goal statement.

7. The method of claim 6 wherein the knowledge base comprises an ontology for a data set addressed by the message.

8. The method of claim 7 wherein the ontology comprises (1) a plurality of entity types, (2) a plurality of attributes associated with a plurality of the entity types, (3) a plurality of qualifiers associated with a plurality of the entity types, and (4) a plurality of relationship types associated with a plurality of the entity types.

9. The method of claim 8 wherein the ontology further comprises a plurality of timeframes associated with a plurality of the entity types.

10. The method of claim 8 wherein the ontology further comprises a plurality of characterizations associated with a plurality of the entity types.

11. The method of claim 7 wherein the knowledge base further comprises the data set, the data set including a plurality of entity instances for a plurality of the entity types and a plurality of attribute values for a plurality of the attributes.

12. The method of claim 7 wherein the knowledge base further comprises a deictic context for a history of messages in a conversation relating to the data set.

13. The method of claim 12 wherein the deictic context associates a plurality of pronouns with a plurality of named entities from the knowledge base.

14. The method of claim 6 further comprising:
 a processor processing the knowledge base;
 a processor extracting the named entities from the knowledge base based on the processing; and
 a processor building a tree structure from the extracted named entities; and
 wherein the named entity recognition performing step comprises a processor comparing the words of the message with the tree structure to identify the named entities in the message.

15. The method of claim 6 wherein the syntactically parsing step comprises a processor performing a constituency parse on the message to generate the data that defines the grammatical hierarchy of the named entities within the message.

16. The method of claim 6 wherein the syntactically parsing step comprises a processor performing a dependency parse on the message to generate the data that defines the grammatical hierarchy of the named entities within the message.

17. The method of claim 6 wherein the reducing step comprises a processor applying the reduction rules to combinations of named entities in the defined hierarchy starting from a lowest named entity in the defined hierarchy and progressing toward a top named entity in the defined hierarchy.

18. The method of claim 17 wherein the named entities in the defined hierarchy have associated named entity types, and wherein the reduction rules define how a plurality of different combinations of named entity types are reduced into a plurality of different aggregations of named entities, wherein each aggregation of named entities also has an associated named entity type.

19. The method of claim 18 wherein the named entity types include an entity, an entity type, a qualifier, an attribute, a relationship, and a relationship type.

20. The method of claim 6 wherein the control instructions comprise a communication goal statement that is parameterized based on the reduced aggregation of named entities.

21. The method of claim 6 wherein the associated named entity type is an entity, and wherein the mapping rules map the entity named entity type to a callout entity communication goal statement.

22. The method of claim 6 wherein the associated named entity type is a combination of an entity and an attribute, and wherein the mapping rules map the entity and attribute combination named entity type to a present a value of an attribute of an entity communication goal statement.

23. The method of claim 6 further comprising:
a processor for the NLG system accessing the knowledge base based on the control instructions to generate the natural language response.

24. The method of claim 23 further comprising:
a processor receiving the message from a chatbot or a graphical user interface (GUI); and
a processor delivering the natural language response to the chatbot or the GUI.

25. The method of claim 23 further comprising:
repeating the method steps with respect to a plurality of messages to generate a plurality of the natural language responses in a conversation string.

26. The method of claim 25 wherein the repeating step comprises repeating the method steps with respect to a plurality of messages to generate a plurality of the natural language responses in a plurality of different conversation strings.

27. The method of claim 26 further comprising:
a processor associating each conversation string with a conversation identifier; and
a processor associating messages and natural language responses to messages with conversation identifiers to define the conversation strings.

28. The method of claim 25 further comprising:
receiving the messages from a plurality of different input channels; and
a processor standardizing the received messages to a common format prior to performing named entity recognition.

29. The method of claim 28 wherein the input channels include at least one of a graphical user interface (GUI) and/or a chatbot.

30. The method of claim 28 wherein the input channels include a plurality of different chatbots.

31. The method of claim 6 wherein the different control instructions for the NLG system correspond to different types of communication goals to be expressed by the natural language response.

32. The method of claim 31 wherein the different types of communication goals comprise at least one of a callout entity communication goal, a present value communication goal, an explain communication goal, a present change communication goal, and/or an explain change communication goal.

33. The method of claim 6 wherein the configuration parameters comprise (1) a specification parameter that represents a type of communication goal to be expressed by the natural language response, and (2) at least one story parameter for use by the NLG system when generating the natural language response, wherein the at least one story parameter is derived from at least one of the identified named entities.

34. The method of claim 33 wherein the at least one story parameter is derived from an aggregated named entity produced by the reducing step.

35. The method of claim 6 wherein the same processor performs the method steps.

36. The method of claim 6 wherein a plurality of different processors perform the method steps.

37. A natural language processing method that applies computer technology to a message to determine a meaning for the message in order to control a natural language generation (NLG) system for responding to the message, wherein the message comprises data representing a plurality of words arranged in natural language, the method comprising:

a processor performing named entity recognition on the words of the message to identify a plurality of named entities that correspond to words in the message based on a knowledge base of named entities;
a processor syntactically parsing the message to generate data that defines a grammatical hierarchy of the named entities within the message;
a processor reducing the named entities within the message to a reduced aggregation of named entities based on the defined grammatical hierarchy and a plurality of reduction rules, wherein the reduced aggregation of named entities represents an inferred core meaning for the message; and
a processor generating control instructions for the NLG system based on the reduced aggregation of named entities, wherein the control instructions comprise a plurality of configuration parameters for the NLG system that are derived from the message, and wherein the control instructions are configured to cause the NLG system to generate a natural language response that expresses a communication goal that is responsive to the inferred core meaning for the message;
wherein the generating step comprises mapping the reduced aggregation of named entities to the control instructions based on a plurality of rules that map different reduced aggregations of named entities to different control instructions for the NLG system;
wherein the reduced aggregation of named entities has an associated named entity type, and wherein the mapping rules map reduced aggregations of named entities to the control instructions based on the associated named entity type for the reduced aggregation of named entities; and
wherein the named entity types further include a timeframe type, wherein the associated named entity type is a combination of an entity, an attribute, a qualifier, and a plurality of timeframes, wherein the qualifier corresponds to a change, and wherein the mapping rules map the entity, attribute, change qualifier, and timeframes combination named entity type to a present change communication goal statement.

38. A natural language processing method that applies computer technology to a message to determine a meaning for the message in order to control a natural language generation (NLG) system for responding to the message, wherein the message comprises data representing a plurality of words arranged in natural language, the method comprising:

a processor performing named entity recognition on the words of the message to identify a plurality of named entities that correspond to words in the message based on a knowledge base of named entities;
a processor syntactically parsing the message to generate data that defines a grammatical hierarchy of the named entities within the message;
a processor reducing the named entities within the message to a reduced aggregation of named entities based on the defined grammatical hierarchy and a plurality of reduction rules, wherein the reduced aggregation of named entities represents an inferred core meaning for the message; and
a processor generating control instructions for the NLG system based on the reduced aggregation of named entities, wherein the control instructions comprise a plurality of configuration parameters for the NLG system that are derived from the message, and wherein the control instructions are configured to cause the NLG system to generate a natural language response that expresses a communication goal that is responsive to the inferred core meaning for the message wherein the generating step comprises mapping the reduced aggregation of named entities to the control instructions based on a plurality of rules that map different reduced aggregations of named entities to different control instructions for the NLG system;

wherein the reduced aggregation of named entities has an associated named entity type, and wherein the mapping rules map reduced aggregations of named entities to the control instructions based on the associated named entity type for the reduced aggregation of named entities; and wherein the named entity types further include a timeframe type, wherein the associated named entity type is a combination of an entity, an attribute, a first qualifier, a second qualifier, and a plurality of timeframes, wherein the first qualifier corresponds to a change, wherein the second qualifier corresponds to a driver, and wherein the mapping rules map the entity, attribute, change qualifier, driver qualifier, and timeframes combination named entity type to an explain change communication goal statement.

39. A natural language processing apparatus for determining a meaning of a message in order to control a natural language generation (NLG) system for responding to the message, wherein the message comprises data representing a plurality of words arranged in natural language, the apparatus comprising:

a memory; and a processor for cooperation with the memory, the processor configured to:

perform named entity recognition on the words of the message to identify a plurality of named entities that correspond to words in the message based on a knowledge base of named entities;

syntactically parse the message to generate data that defines a grammatical hierarchy of the named entities within the message;

reduce the named entities within the message to a reduced aggregation of named entities based on the defined grammatical hierarchy and a plurality of reduction rules, wherein the reduced aggregation of named entities represents an inferred core meaning for the message; and generate control instructions for the NLG system based on the reduced aggregation of named entities, wherein the control instructions comprise a plurality of configuration parameters for the NLG system that are derived from the message, and wherein the control instructions are configured to cause the NLG system to generate a natural language response that expresses a communication goal that is responsive to the inferred core meaning for the message;

wherein the processor is further configured to map the reduced aggregation of named entities to the control instructions based on a plurality of rules that map different reduced aggregations of named entities to different control instructions for the NLG system;

wherein the reduced aggregation of named entities has an associated named entity type, and wherein the mapping rules map reduced aggregations of named entities to the control instructions based on the associated named entity type for the reduced aggregation of named entities; and wherein the associated named entity type is a combination of an entity, an attribute, and a qualifier, wherein the qualifier corresponds to a driver, and wherein the mapping rules map the entity, attribute, and driver qualifier combination named entity type to an explain communication goal statement.

40. The apparatus of claim 39 wherein the processor is further configured to apply the reduction rules to combinations of named entities in the defined hierarchy starting from a lowest named entity in the defined hierarchy and progressing toward a top named entity in the defined hierarchy.

41. The apparatus of claim 40 wherein the named entities in the defined hierarchy have associated named entity types, and wherein the reduction rules define how a plurality of different combinations of named entity types are reduced into a plurality of different aggregations of named entities, wherein each aggregation of named entities also has an associated named entity type.

42. The apparatus of claim 41 wherein the named entity types include an entity, an entity type, a qualifier, an attribute, a relationship, and a relationship type.

43. A natural language processing apparatus for determining a meaning of a message in order to control a natural language generation (NLG) system for responding to the message, wherein the message comprises data representing a plurality of words arranged in natural language, the apparatus comprising:

a memory; and a processor for cooperation with the memory, the processor configured to:

perform named entity recognition on the words of the message to identify a plurality of named entities that correspond to words in the message based on a knowledge base of named entities;

syntactically parse the message to generate data that defines a grammatical hierarchy of the named entities within the message;

reduce the named entities within the message to a reduced aggregation of named entities based on the defined grammatical hierarchy and a plurality of reduction rules, wherein the reduced aggregation of named entities represents an inferred core meaning for the message; and generate control instructions for the NLG system based on the reduced aggregation of named entities, wherein the control instructions comprise a plurality of configuration parameters for the NLG system that are derived from the message, and wherein the control instructions are configured to cause the NLG system to generate a natural language response that expresses a communication goal that is responsive to the inferred core meaning for the message;

wherein the processor is further configured to map the reduced aggregation of named entities to the control instructions based on a plurality of rules that map different reduced aggregations of named entities to different control instructions for the NLG system;

wherein the reduced aggregation of named entities has an associated named entity type, and wherein the mapping rules map reduced aggregations of named entities to the control instructions based on the associated named entity type for the reduced aggregation of named entities; and wherein the named entity types further include a timeframe type, wherein the associated named entity type is a combination of an entity, an attribute, a qualifier, and a plurality of timeframes, wherein the qualifier corresponds to a change, and wherein the mapping rules map the entity, attribute, change qualifier, and timeframes combination named entity type to a present change communication goal statement.

44. The apparatus of claim 43 wherein the different control instructions for the NLG system correspond to different types of communication goals to be expressed by the natural language response.

45. The apparatus of claim 44 wherein the different types of communication goals comprise at least one of a callout entity communication goal, a present value communication goal, an explain communication goal, a present change communication goal, and/or an explain change communication goal.

46. The apparatus of claim 43 wherein the associated named entity type is an entity, and wherein the mapping rules map the entity named entity type to a callout entity communication goal statement.

47. The apparatus of claim 43 wherein the associated named entity type is a combination of an entity and an attribute, and wherein the mapping rules map the entity and attribute combination named entity type to a present a value of an attribute of an entity communication goal statement.

48. The apparatus of claim 43 wherein the configuration parameters comprise (1) a specification parameter that represents a type of communication goal to be expressed by the natural language response, and (2) at least one story parameter for use by the NLG system when generating the natural language response, wherein the at least one story parameter represents at least one of the identified named entities.

49. The apparatus of claim 48 wherein the at least one story parameter represents an aggregated named entity produced by the reduce operation.

50. The apparatus of claim 43 wherein the processor comprises a plurality of processors.

51. The apparatus of claim 43 wherein the processor is further configured to implement the NLG system.

52. The apparatus of claim 43 wherein the processor is further configured to syntactically parse the message by performing a constituency parse on the message to generate the data that defines the grammatical hierarchy of the named entities within the message.

53. The apparatus of claim 43 wherein the processor is further configured to syntactically parse the message by performing a dependency parse on the message to generate the data that defines the grammatical hierarchy of the named entities within the message.

54. The apparatus of claim 43 wherein the control instructions comprise a communication goal statement that is parameterized based on the reduced aggregation of named entities.

55. The apparatus of claim 43 further comprising:
the NLG system, wherein the NLG system is configured to access the knowledge base based on the control instructions to generate the natural language response.

56. The apparatus of claim 55 wherein the processor is further configured to (1) receive the message from a chatbot or a graphical user interface (GUI), and (2) deliver the natural language response to the chatbot or the GUI.

57. A natural language processing apparatus for determining a meaning of a message in order to control a natural language generation (NLG) system for responding to the message, wherein the message comprises data representing a plurality of words arranged in natural language, the apparatus comprising:

a memory; and
a processor for cooperation with the memory, the processor configured to:
perform named entity recognition on the words of the message to identify a plurality of named entities that correspond to words in the message based on a knowledge base of named entities;
syntactically parse the message to generate data that defines a grammatical hierarchy of the named entities within the message;
reduce the named entities within the message to a reduced aggregation of named entities based on the defined grammatical hierarchy and a plurality of reduction rules, wherein the reduced aggregation of named entities represents an inferred core meaning for the message; and
generate control instructions for the NLG system based on the reduced aggregation of named entities, wherein the control instructions comprise a plurality of configuration parameters for the NLG system that are derived from the message, and wherein the control instructions are configured to cause the NLG system to generate a natural language response that expresses a communication goal that is responsive to the inferred core meaning for the message.
wherein the processor is further configured to map the reduced aggregation of named entities to the control instructions based on a plurality of rules that map different reduced aggregations of named entities to different control instructions for the NLG system;
wherein the reduced aggregation of named entities has an associated named entity type, and wherein the mapping rules map reduced aggregations of named entities to the control instructions based on the associated named entity type for the reduced aggregation of named entities; and
wherein the named entity types further include a timeframe type, wherein the associated named entity type is a combination of an entity, an attribute, a first qualifier, a second qualifier, and a plurality of timeframes, wherein the first qualifier corresponds to a change, wherein the second qualifier corresponds to a driver, and wherein the mapping rules map the entity, attribute, change qualifier, driver qualifier, and timeframes combination named entity type to an explain change communication goal statement.

58. The apparatus of claim 57 wherein the processor is further configured to apply the reduction rules to combinations of named entities in the defined hierarchy starting from a lowest named entity in the defined hierarchy and progressing toward a top named entity in the defined hierarchy.

59. The apparatus of claim 58 wherein the named entities in the defined hierarchy have associated named entity types, and wherein the reduction rules define how a plurality of different combinations of named entity types are reduced into a plurality of different aggregations of named entities, wherein each aggregation of named entities also has an associated named entity type.

60. The apparatus of claim 59 wherein the named entity types include an entity, an entity type, a qualifier, an attribute, a relationship, and a relationship type.

61. A natural language processing apparatus for determining a meaning of a message in order to control a natural language generation (NLG) system for responding to the message, wherein the message comprises data representing a plurality of words arranged in natural language, the apparatus comprising:

a memory; and a processor for cooperation with the memory, the processor configured to:

perform named entity recognition on the words of the message to identify a plurality of named entities that correspond to words in the message based on a knowledge base of named entities;

syntactically parse the message to generate data that defines a grammatical hierarchy of the named entities within the message;

reduce the named entities within the message to a reduced aggregation of named entities based on the defined grammatical hierarchy and a plurality of reduction rules, wherein the reduced aggregation of named entities represents an inferred core meaning for the message; and generate control instructions for the NLG system based on the reduced aggregation of named entities, wherein the control instructions comprise a plurality of configuration parameters for the NLG system that are derived from the message, and wherein the control instructions are configured to cause the NLG system to generate a natural language response that expresses a communication goal that is responsive to the inferred core meaning for the message;

wherein the processor is further configured to apply the reduction rules to combinations of named entities in the defined hierarchy starting from a lowest named entity in the defined hierarchy and progressing toward a top named entity in the defined hierarchy;

wherein the named entities in the defined hierarchy have associated named entity types, and wherein the reduction rules define how a plurality of different combinations of named entity types are reduced into a plurality of different aggregations of named entities, wherein each aggregation of named entities also has an associated named entity type;

wherein the named entity types include an entity, an entity type, a qualifier, an attribute, a relationship, and a relationship type; and wherein the reduction rules comprise:

a first reduction rule that reduces a combination of named entities corresponding to the entity named entity type, the qualifier named entity type, and the attribute named entity type to an aggregated named entity corresponding to the entity named entity type;

a second reduction rule that reduces a combination of named entities corresponding to the relationship type named entity type and the entity named entity type to an aggregated named entity corresponding to the relationship entity type;

a third reduction rule that reduces a combination of named entities corresponding to the entity named entity type and the relationship named entity type to an aggregated named entity corresponding to the entity named entity type; and a fourth reduction rule that reduces one or more named entities corresponding to the entity type named entity type to an aggregated named entity corresponding to the entity named entity type.

62. The apparatus of claim 61 wherein the processor is further configured to map the reduced aggregation of named entities to the control instructions based on a plurality of rules that map different reduced aggregations of named entities to different control instructions for the NLG system.

63. The apparatus of claim 61 wherein the processor is further configured to apply the reduction rules to combinations of adjacent named entities in the defined hierarchy starting from the lowest named entity in the defined hierarchy and progressing toward the top named entity in the defined hierarchy.

* * * * *